US010474006B2

(12) United States Patent
Ariav et al.

(10) Patent No.: US 10,474,006 B2
(45) Date of Patent: Nov. 12, 2019

(54) OUTDOOR PHOTOGRAPHY SYSTEM

(71) Applicant: Lifetouch Inc., Eden Prairie, MN (US)

(72) Inventors: Haim Ariav, Ponte Vedra Beach, FL (US); Timothy Lindabury, Fort Myers, FL (US); Peter J. Origlio, Jacksonville, FL (US)

(73) Assignee: Lifetouch Inc., Eden Prairie, MN (US)

( * ) Notice: Subject to any disclaimer, the term of this patent is extended or adjusted under 35 U.S.C. 154(b) by 0 days.

(21) Appl. No.: 15/492,750

(22) Filed: Apr. 20, 2017

(65) Prior Publication Data

US 2018/0307121 A1  Oct. 25, 2018

(51) Int. Cl.
| | | |
|---|---|---|
| *G03B 15/06* | (2006.01) | |
| *G03B 17/56* | (2006.01) | |
| *H04N 5/225* | (2006.01) | |
| *F16M 11/04* | (2006.01) | |
| *E04H 15/18* | (2006.01) | |
| *H04N 5/232* | (2006.01) | |
| *H04N 5/272* | (2006.01) | |
| *G03B 15/05* | (2006.01) | |

(52) U.S. Cl.
CPC ............ *G03B 15/06* (2013.01); *E04H 15/18* (2013.01); *F16M 11/04* (2013.01); *G03B 15/05* (2013.01); *G03B 17/561* (2013.01); *G03B 17/568* (2013.01); *H04N 5/2256* (2013.01); *H04N 5/232* (2013.01); *H04N 5/23296* (2013.01); *H04N 5/272* (2013.01); *G03B 2215/0539* (2013.01)

(58) Field of Classification Search
CPC ...... G03B 15/06; G03B 15/05; G03B 17/561; G03B 17/568; G06T 7/194; G06T 7/11; H04N 5/2256; H04N 5/232; H04N 5/23296; H04N 5/272; E04H 15/18; F16M 11/04

See application file for complete search history.

(56) References Cited

U.S. PATENT DOCUMENTS

| 4,816,854 | A | * | 3/1989 | Tsuji ...................... G03B 15/05 |
| | | | | 315/241 P |
| 5,986,718 | A | * | 11/1999 | Barwacz .................. H04N 9/75 |
| | | | | 345/634 |
| 7,834,894 | B2 | | 11/2010 | Swanson et al. |
| 9,366,943 | B2 | * | 6/2016 | Tenmyo ................. G03B 15/05 |
| 9,438,817 | B1 | * | 9/2016 | Baker .................. H04N 5/2256 |
| 9,921,456 | B2 | * | 3/2018 | Miyakawa ............. G03B 15/05 |
| 2003/0175024 | A1 | * | 9/2003 | Miyoshi ................. G01B 11/24 |
| | | | | 396/154 |

(Continued)

OTHER PUBLICATIONS www.partywithlyle.com, See Our Mobile Green Screen Studio, Mar. 23, 2017, 15 pages.

*Primary Examiner* — Antoinette T Spinks
(74) *Attorney, Agent, or Firm* — Merchant & Gould P.C.

(57) ABSTRACT

A photography system provides a photography station which can be conveniently set up and provides consistent quality of photographs regardless of ambient conditions. The system includes a digital camera, a ring flash, and a tent providing a subject space for arranging the subject during photography. The tent is configured to surround the subject to at least partially isolate the subject from the surroundings. The system further includes a background unit arranged within the tent to allow for subsequent background replacement processing.

18 Claims, 18 Drawing Sheets

(56) References Cited

U.S. PATENT DOCUMENTS

| | | | | |
|---|---|---|---|---|
| 2003/0231494 | A1* | 12/2003 | Shimokawa | G01N 21/8806 362/245 |
| 2005/0231948 | A1* | 10/2005 | Pohlert | F21V 14/06 362/237 |
| 2008/0166111 | A1* | 7/2008 | Didow | G03B 15/07 396/3 |
| 2008/0198271 | A1* | 8/2008 | Malki | G10H 1/365 348/722 |
| 2010/0315816 | A1* | 12/2010 | Madelin | G03B 15/06 362/294 |
| 2011/0123184 | A1* | 5/2011 | Mather | G03B 15/05 396/176 |
| 2013/0044466 | A1* | 2/2013 | Scharer, III | A63J 1/00 362/157 |
| 2014/0233913 | A1* | 8/2014 | Scharer, III | H04N 5/272 386/278 |
| 2014/0362555 | A1* | 12/2014 | Turk | G03B 15/03 362/3 |
| 2015/0302690 | A1* | 10/2015 | Hutchinson-Kay | G07F 17/3223 463/42 |
| 2015/0347845 | A1 | 12/2015 | Benson | |
| 2015/0381905 | A1* | 12/2015 | Berman | H04N 5/272 396/2 |
| 2016/0044217 | A1* | 2/2016 | Richardson | H04N 5/2256 348/207.11 |
| 2017/0251172 | A1* | 8/2017 | McNelley | H04N 7/142 |
| 2018/0084204 | A1* | 3/2018 | Berman | H04N 1/00289 |
| 2019/0156586 | A1* | 5/2019 | Yoon | G02B 27/00 |

\* cited by examiner

OUTDOOR PHOTOGRAPHY SYSTEM

BACKGROUND

Portrait photographs are often taken with digital cameras in portrait studios or outside environments. One of the advantages that digital photography has over traditional film-based photography is that digital images can be further processed even after the camera has taken and stored the image. Because the digital image is stored as digital data that fully describes the digital image, digital processing can be used to manipulate that data in a wide variety of ways. Such digital processing includes background replacement technology. Background replacement technology typically operates to remove portions of an image associated with a background behind the subject, and to replace those portions of the image with one or more replacement images.

Outdoor photography is performed in various situations. One example is to take photographs of athletes in an outdoor sports team. In another example, other people doing outdoor activities, such as students in outdoor sports teams, can be photographed in an outdoor environment. Photographs of such athletes or other people are often taken outdoors in the natural sports team setting. One challenge of outdoor photography is that background replacement can be difficult for such outdoor photographs. Background replacement technology involves a process of accurately distinguishing the background from the subject in a photograph. However, the quality of photographs taken outdoors is typically poor and inconsistent due to various uncontrollable factors, such as inconsistent natural light, changing ambient conditions (e.g., wind), and undesirable background scenes (e.g., moving or distracting objects present behind the subject). In addition, a photography station needs to be configured such that a photographer can conveniently transport and set up the photography station at an outdoor site and easily capture photographs of a consistent quality suitable for background replacement.

SUMMARY

In general terms, this disclosure is directed to an outdoor photography system. In one possible configuration and by non-limiting example, the system includes an outdoor tent for arranging a subject and an image capture system capturing an image of the subject. Various aspects are described in this disclosure, which include, but are not limited to, the following aspects.

One aspect is a photography system including a digital camera unit arranged and configured to capture a digital image of a subject, a light assembly comprising a ring flash arranged with respect to the digital camera unit, and a tent providing a subject space for arranging the subject during photography. The tent is configured to surround the subject to at least partially isolate the subject from surroundings. The tent has an open side through which the digital camera unit captures the digital image of the subject. The system further includes a background unit that is arranged within the tent to provide a background when the subject is photographed by the digital camera unit.

Another aspect is a method for capturing a digital image of a subject in an outdoor environment. The method includes setting up an outdoor tent in the outdoor environment, the outdoor tent having an open side; arranging a digital camera unit toward the open side of the outdoor tent; mounting a ring flash unit relative to the digital camera unit; arranging the subject within the outdoor tent to surround the subject; controlling the ring flash unit to illuminate the subject through the open side of the tent; and controlling the digital camera unit to capture a digital image through the open side of the tent while the ring flash unit is illuminated.

Yet another aspect is a photography system including a digital camera unit arranged and configured to capture a digital image of a subject, a light assembly comprising a ring flash arranged with respect to the digital camera unit, an outdoor tent providing a subject space for arranging the subject during photography. The outdoor tent is configured to surround the subject to at least partially isolate the subject from surroundings. The outdoor tent has an open side through which the digital camera unit captures the digital image of the subject. The system further includes a background unit that is arranged within the outdoor tent to provide a background when the subject is photographed by the digital camera unit. The system can also include a computing device having a processing device, and at least one computer readable storage device storing data instructions, which when executed by the processing device, cause the processing device to: detect a background scene in the digital image associated with the background unit, and distinguish the background scene from the subject in the digital image based at least in part upon the detected background scene.

DETAILED DESCRIPTION

Figure 1:
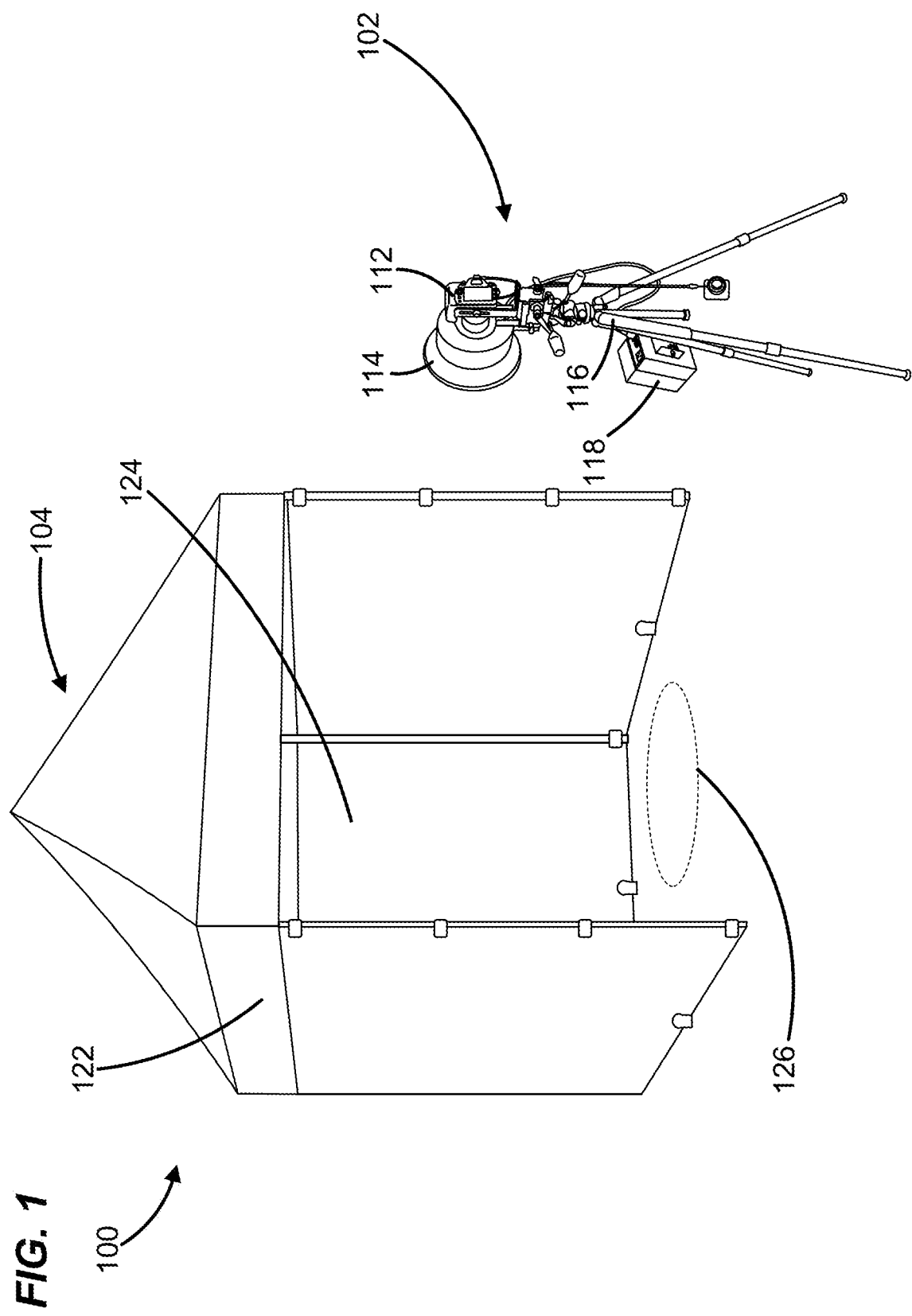
FIG. 1 illustrates an example photography station for outdoor photography.

Various embodiments will be described in detail with reference to the drawings, wherein like reference numerals represent like parts and assemblies throughout the several views.

FIG. 1 illustrates an example photography station 100 for outdoor photography. In one example, the photography station 100, which is also referred to herein as a photography system, includes an image capture system 102 and a station assembly 104.

In some embodiments, the photography station 100 is configured for capturing a photograph of a subject in an outdoor environment. For example, the photography station 100 is used to take photographs of athletes. In another example, other people doing outdoor activities, such as students in outdoor sports teams, can be photographed using the photography station 100. Photographs of such athletes or other people can be taken in an outdoor environment to provide more energetic and lively expressions of the athletes or people. It is also more convenient for such athletes or people to be photographed because they are already at the playing field in their natural outdoor setting. However, as described herein, the quality of photographs taken at outdoor environments can be poor or inconsistent for various reasons. For example, the photography station 100 can be set up any place where subjects are present for outdoor activities, such as football, soccer, or baseball. Thus, various elements that affect the quality of photographs are not controllable during photography. Some examples of such uncontrollable elements include inconsistent natural light (e.g., too bright of a light or lack of light), changing ambient conditions (e.g., wind), and undesirable background scenes (e.g., moving or distracting objects behind the subject). As described herein, the photography station 100 is configured to enable a photographer to easily set up the station 100 and capture quality photographs of subjects regardless of ambient conditions around the photography station.

The image capture system 102 includes one or more devices for capturing a subject arranged at the station assembly 104. Various devices of the image capture system 102 is illustrated and described with reference to FIGS. 2 and 3.

The station assembly 104 is configured to arrange the subject and provides an optimal environment in which outdoor photographs are captured to be suitable for background replacement processing. In some embodiments, the station assembly 104 includes a tent 122 and a background unit 124.

The tent 122 is configured to be set up in an outdoor environment and provides a subject space 126 at which a subject is placed for photography. An example of the tent 122 is further described and illustrated with reference to FIG. 9.

The background unit 124 provides an area or scenery behind the subject standing in front of the image capture system 102. The subject arranged between the image capture system 102 and the background unit 124. An example of the background unit 124 is described and illustrated with reference to FIG. 10.

Figure 2:
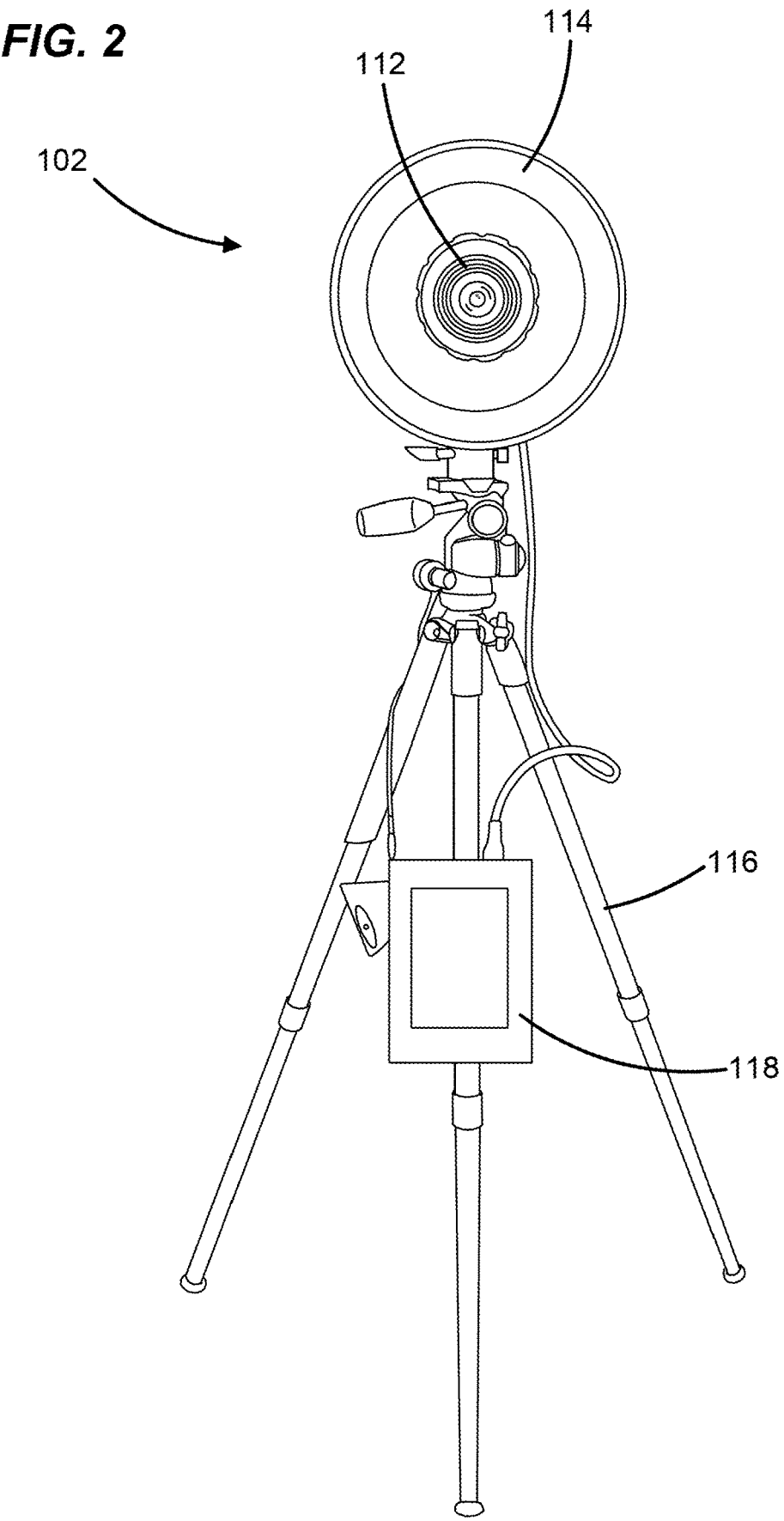
FIG. 2 is a front perspective view of an example image capture system.
Figure 3:
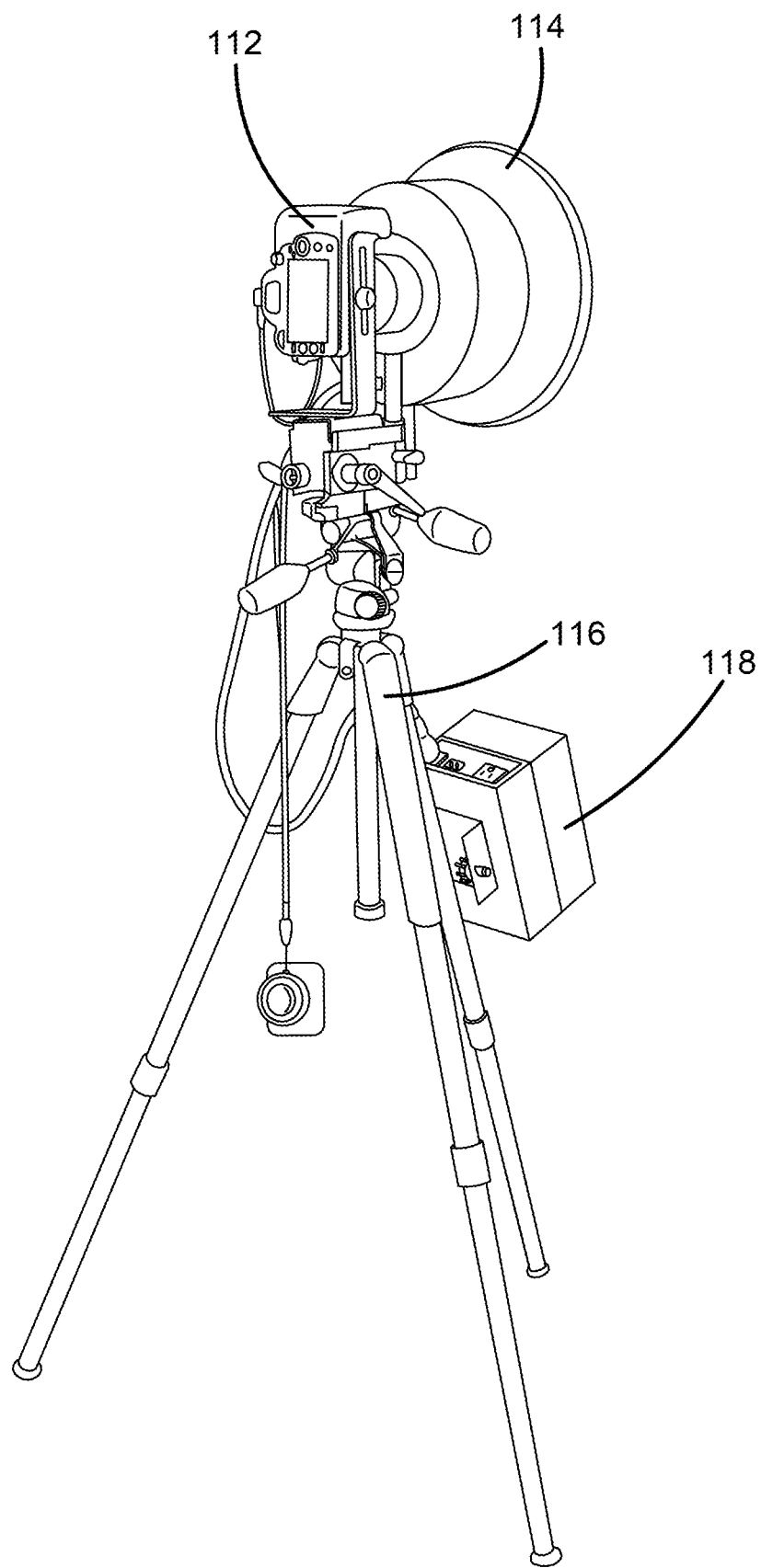
FIG. 3 is a rear perspective view of the image capture system of FIG. 2.

Referring to FIGS. 2 and 3, an example image capture system 102 is further described and illustrated. FIG. 2 is a front perspective view of an example image capture system 102, and FIG. 3 is a rear perspective view of the image capture system 102 of FIG. 2. In some embodiments, the image capture system 102 includes a camera 112, a light assembly 114, a stand 116, and a portable power supply 118.

The camera 112 is typically a digital camera that operates to capture digital images of one or more subjects. An example of camera 112 is described and illustrated in more detail herein with reference to FIG. 4.

The light assembly 114 is configured to mount to the camera 112 and illuminate a subject arranged within the tent 122 as described herein. The light assembly 114 can be synchronized with the camera 112. As described herein, the light assembly 114 includes a ring light. An example of the light assembly 114 is further described and illustrated in FIGS. 5-7.

In some embodiments, the light assembly 114 is a main light used for photography. In this configuration, the light assembly 114 can be used as the only lighting device for illuminating the subject, and any other lights, such as fill lights, edge lights, and background lights, are not used. For example, a ring light 250 (e.g., a ring flash) is the only lighting device of the light assembly 114. In some embodiments the light assembly 114 is free from any other light sources for illuminating the subject. In other embodiments, the light assembly 114 is used with one or more other lights arranged apart from the light assembly 114.

The stand 116 is configured to mount the camera 112. In some embodiments, the stand 116 is further configured to mount the light assembly 114. The stand 116 can have various configurations, such as a tripod or other support structure. In some embodiments, the height of the camera 112 is manually adjusted. In other embodiments, the height of the camera 112 is adjusted by a motor coupled to a shaft of the tripod. When the motor rotates, the shaft of the tripod extends or contracts to raise or lower the camera 112. In some embodiments, the camera 112 is mounted to the shaft at a fixed and non-variable angle relative to the vertical shaft of tripod. In other embodiments, the camera 112 is mounted to be adjustable in angle and/or orientation relative to the vertical shaft of tripod.

The portable power supply 118 is used to supply power to either or both of the camera 112 and the light assembly 114. In some embodiments, the portable power supply 118 is used as a secondary power source when the camera 112 and/or the light assembly 114 have, or are connected to, their own power supply. In other embodiments, the portable power supply 118 is used as a primary power source for the camera 112 and the light assembly 114. In this example, the portable power supply 118 is a battery, which is single-use or rechargeable. In some embodiments, the portable power supply 118 is mounted to the stand 116.

In some alternate embodiments, one or more of the camera 112, the light assembly 114, the stand 116, and/or the portable power supply 118 are a single device. For example, in some embodiments, the camera 112 and the light assembly 114 are configured as a single device that illuminates a subject and captures digital images of the subject. In other embodiments, additional devices are used to perform one or more functions of these devices.

Figure 4:
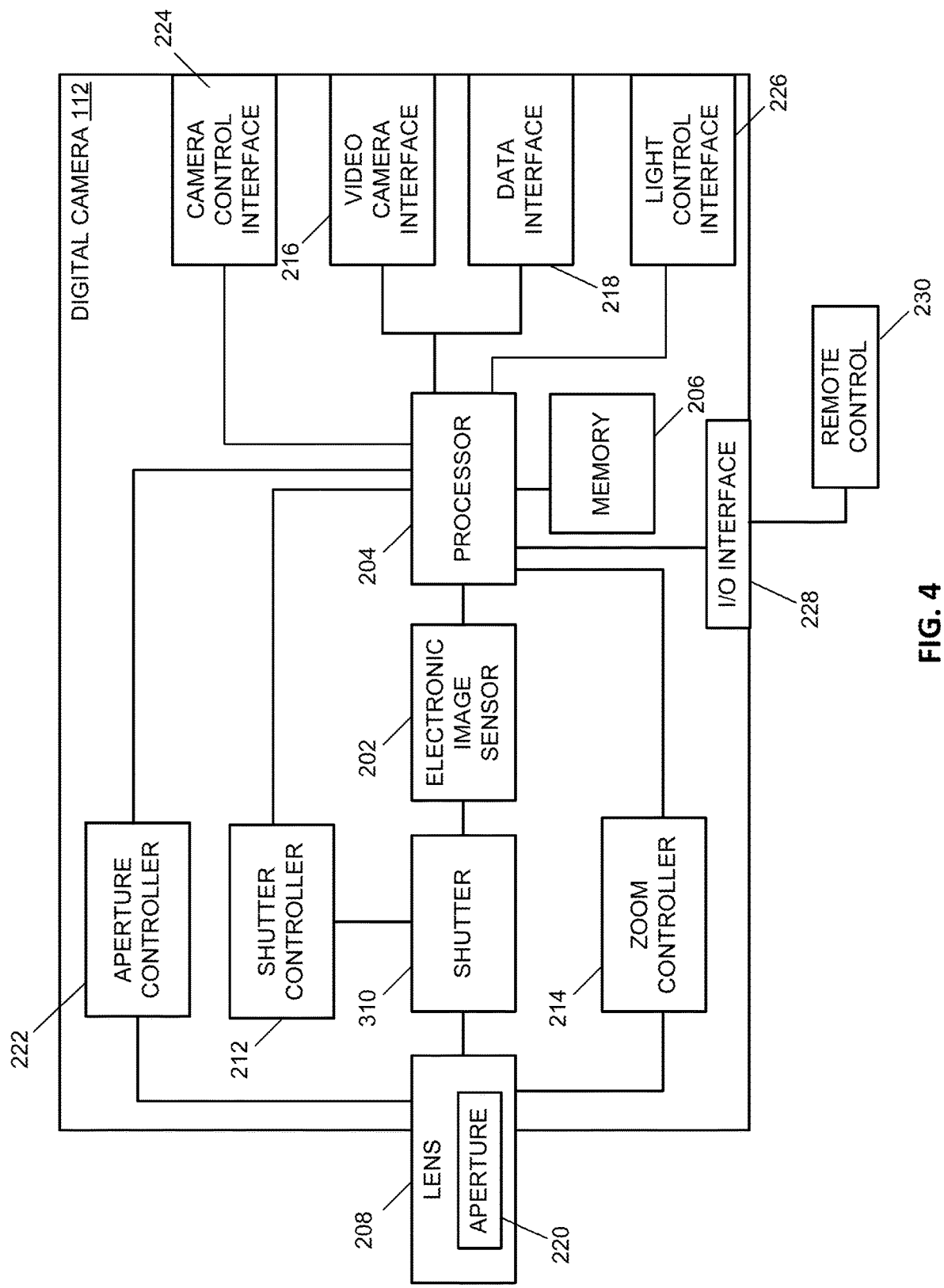
FIG. 4 is a schematic block diagram of an example camera.

FIG. 4 is a schematic block diagram of an example camera 112. The camera 112 is typically a digital camera including at least an electronic image sensor 202 for converting an optical image to an electric signal, a processor 204 for controlling the operation of the camera 112, and a memory 206 for storing the electric signal in the form of digital image data.

An example of the electronic image sensor 202 is a charge-coupled device (CCD). Another example of the electronic image sensor 202 is a complementary metal-oxide-semiconductor (CMOS) active-pixel sensor. The electronic image sensor 202 receives light from a subject and background and converts the received light into electrical signals. The signals are converted into a voltage, which is then sampled, digitized, and stored as digital image data in the memory 206.

The memory 206 can include various different forms of computer readable storage media, such as random access memory. In some embodiments, the memory 206 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the camera 112 includes three main sections: a lens 208, a mechanical shutter 210, and a CCD element 202. Generally, the CCD element 202 has relatively rapid exposure speeds.

The lens 208 is located in front of the shutter 210 and is selected to provide the appropriate photographic characteristics of light transmission, depth of focus, etc. The lens 208 has an aperture 220 through which light travels into the camera body. The size ("diaphragm") of the aperture 220 is expressed in f-stops and adjustable through an aperture controller 222. The aperture controller 222 is used to mechanically adjust the size of the aperture 220 to set different f-stops of the digital camera 112.

A zoom controller 214 is also provided in some embodiments to mechanically adjust the lens 208 to cause the digital camera 112 to zoom in and out on a subject. The zoom controller 214 typically includes a motor that adjusts the lens 208 accordingly.

In some embodiments, the lens 208 is selected between 30 and 350 mm, with the image taken at an f-stop generally in the range of f5 to f22. This provides a zone focus for the image. It also generally eliminates concerns regarding ambient light. However, it will be appreciated that other numbers of lenses, focusing, and f-stops may be employed in connection with the present invention.

The camera 112 provides a camera control interface 224 for controlling operation of the camera 112. In addition, in some embodiments, the camera control interface 224 can be used to control the light assembly 114.

In some embodiments, the camera control interface 224 includes a shutter release for activating the shutter and capturing a photograph, a controller (e.g., jog dial) for adjusting aperture and/or shutter speed settings, a shooting mode controller (e.g., shooting mode dial) for selecting shooting type (e.g., Program Auto Exposure, Aperture-Priority, Shutter-Priority, and Manual), a zoom controller (e.g., a zoom ring) for zooming in and out, a focus controller (e.g., focus ring) for manually adjusting focus, an ISO setting button for adjusting ISO settings, and other buttons, controls, switches, and levers for changing different photography settings and features. In other embodiments, the camera control interface 224 is at least partially implemented on a touch-sensitive display of the camera 112.

For example, a photographer uses the camera control interface 224 to control the lens 208 and the shutter 210. To control the shutter, the processor 204 can receive a corresponding user input (e.g., a capture input) through the camera control interface 224 and generates a signal (e.g., a shutter release signal or a shutter speed adjustment signal) that is communicated to the shutter controller 212 of the camera 112. Upon receiving a user input for controlling the aperture, an aperture adjustment signal can be generated from the processor 204 and communicated to the aperture controller 222. Upon receiving a user input of zooming, a zooming signal can be generated from the processor 204 and communicated to the zoom controller 214. Other embodiments can use other methods and devices to initiate the image capture and control various features of the camera.

In some possible embodiments a remote control is provided to receive inputs from the photographer. The inputs are communicated either via a wire or wirelessly to the camera 112, which interprets them similarly to inputs received through the camera control interface 224.

In some embodiments, the digital camera 112 includes a video camera interface 216 and a data interface 218. The video camera interface 216 communicates live video data from the digital camera 112 to another computing device in some embodiments. The data interface 218 is a data communication interface that sends and receives digital data to communicate with another device. For example, in some embodiments, the data interface 218 receives image capture messages from another device that instructs the digital camera 112 to capture one or more digital images. The data interface 218 is also used in some embodiments to transfer captured digital images from the memory 206 to another device. Examples of the video camera interface 216 and the data interface 218 are USB interfaces. In some embodiments, the video camera interface 216 and the data interface 218 are the same, while in other embodiments they are separate interfaces.

Figure 7:
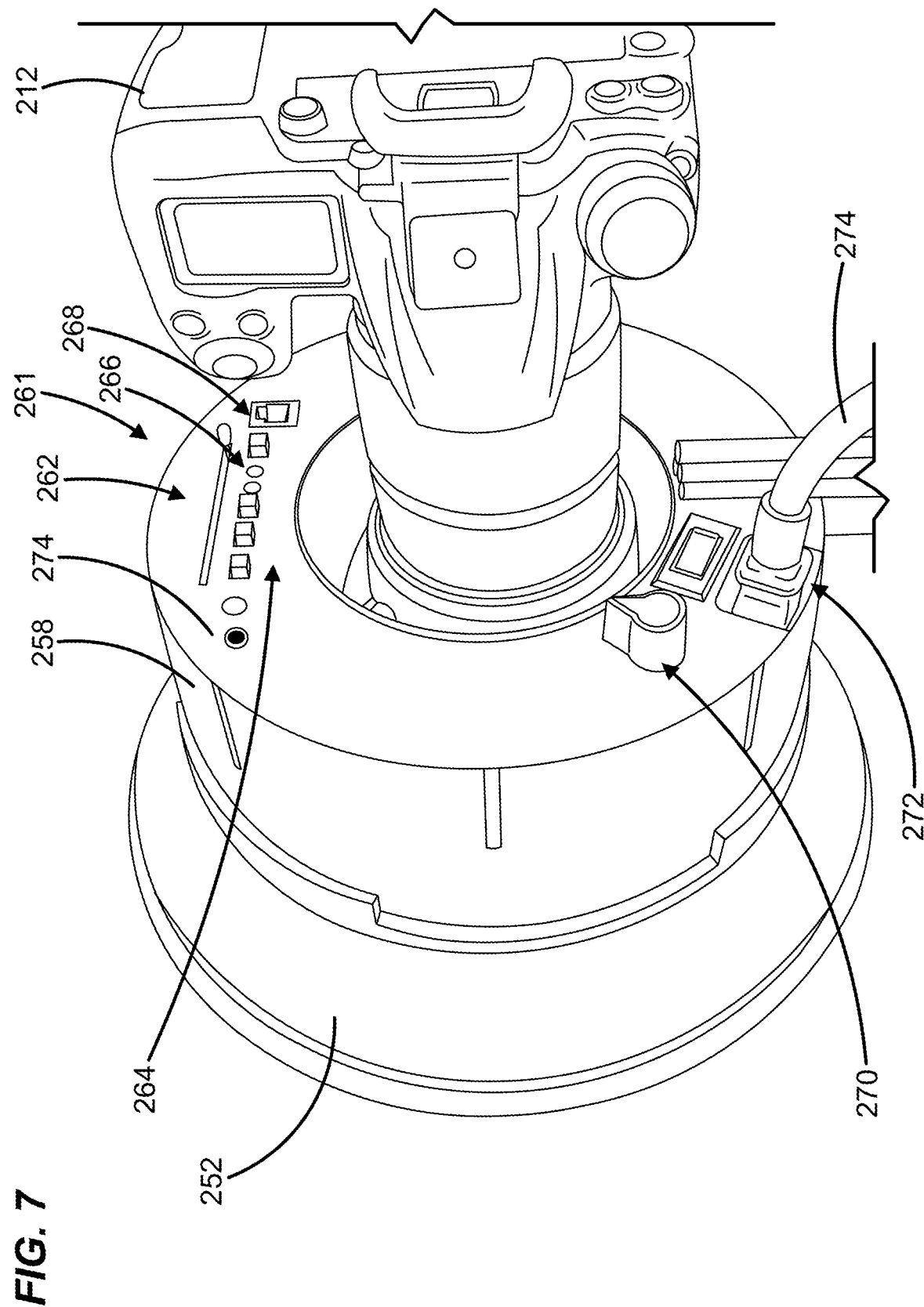
FIG. 7 is a rear perspective view of the light assembly of FIG. 5.

In some embodiments, the camera 112 includes a light control interface 226 configured to connect one or more lights and synchronize operation of the lights with capturing of photographs. In this example, the light control interface 226 allows the camera 112 to control the operation of the light assembly 114. As described herein, the light assembly 114 can be connected to the camera 112 through the light control interface 226 and controlled by the camera 112. For example, a photographer can at least partially control the light assembly 114 through the camera control interface 224 such that a shutter release of the camera 112 is synchronized with illumination of the light assembly 114. In this example, the light control interface 226 can provide a physical interface or port, such as a sync interface 274 (FIG. 7).

The light control interface 226 can be of various forms. In one example, the light control interface 226 is a hot shoe, which is typically a mounting point on the top of the camera to attach a flash unit and other compatible accessories. The light assembly 114 can be connected to the hot shoe of the camera 112 through a cord or cable. In another example, the light control interface 226 is a wireless communication interface which wirelessly connects between the camera 112 and the light assembly 114.

In some embodiments, the light control interface 226 is a send only interface that does not receive return communications from the lights. Other embodiments permit bidirectional communication. The light control interface 226 is operable to selectively illuminate one or more lights at a given time. The operation of the camera 112, such as a shutter release, is synchronized with the illumination of the light assembly 114.

In some embodiments, the camera 112 includes an input/output interface 228 for connecting one or more input devices, such as a remote control 230. The input devices can be connected by any number of the input/output interfaces 228 in various embodiments, such as a parallel port, serial port, game port, universal serial bus, or wireless interface.

Figure 5:
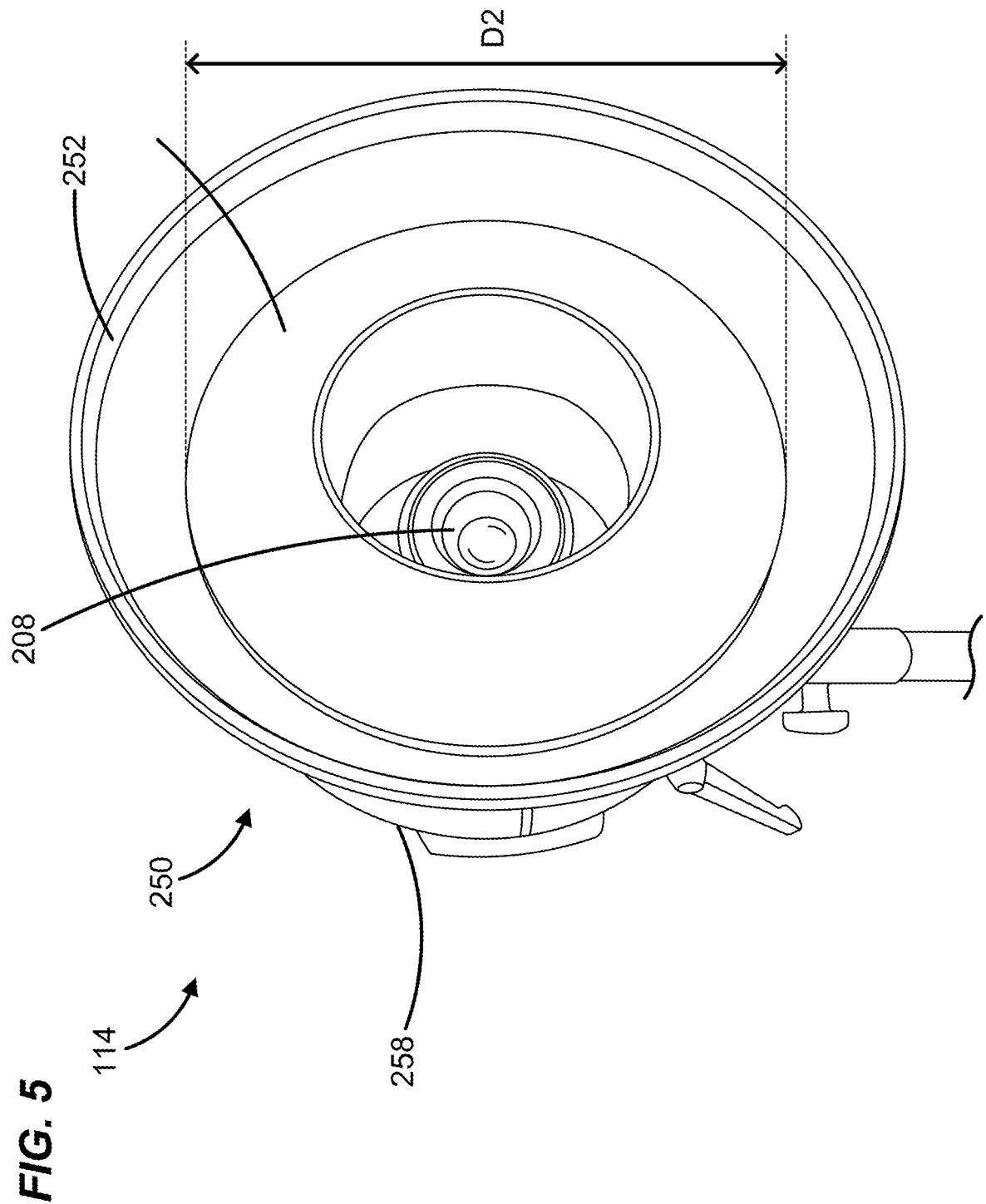
FIG. 5 is a front perspective view of an example light assembly.
Figure 6:
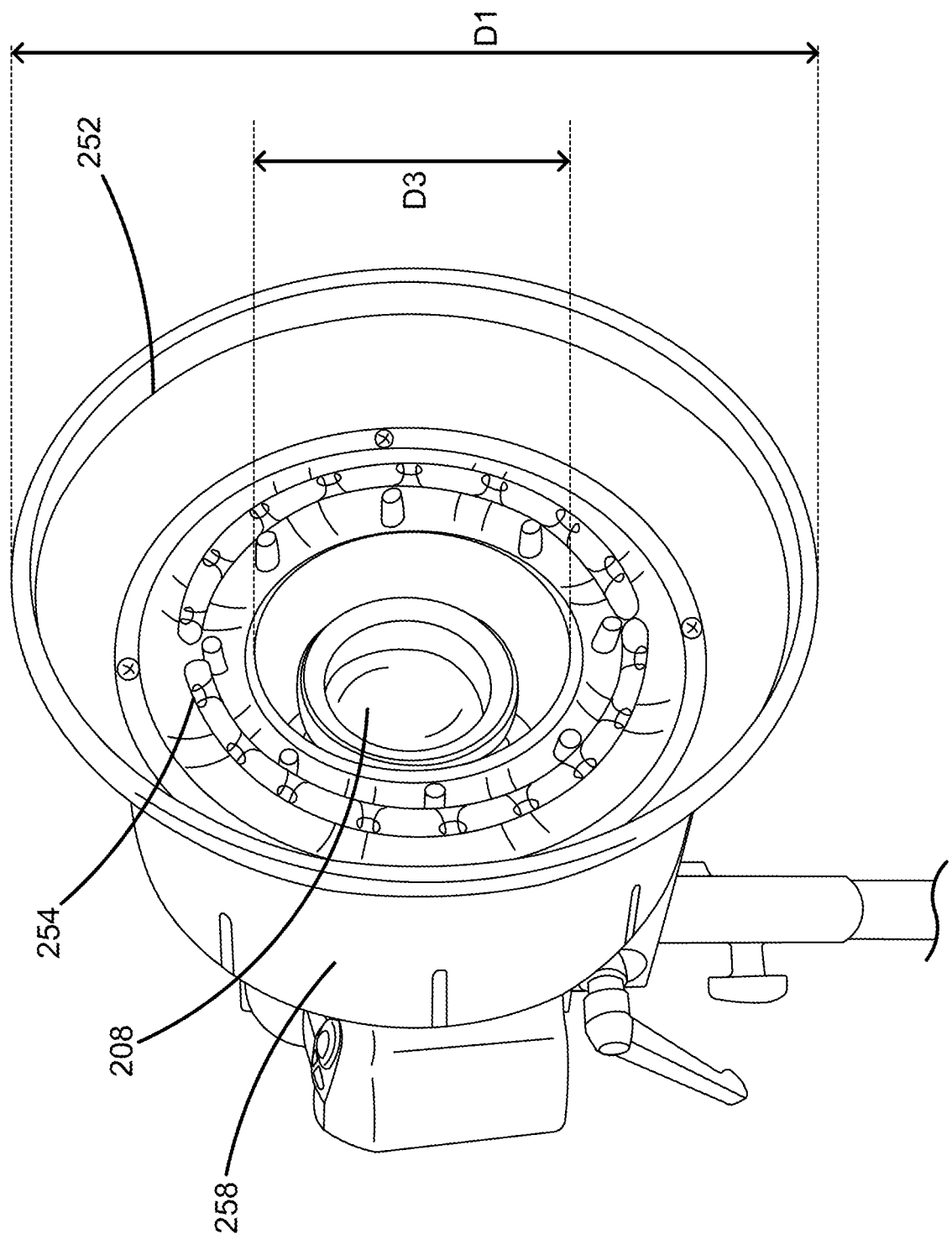
FIG. 6 is a front perspective view of the light assembly without a diffuser.

Referring to FIGS. 5-7, an example light assembly 114 is described and illustrated. FIG. 5 is a front perspective view of an example light assembly 114, which is mounted to the camera 112, FIG. 6 is a front perspective view of the light assembly 114 without a diffuser, and FIG. 7 is a rear perspective view of the light assembly 114 of FIG. 5.

The light assembly 114 is configured to illuminate a subject while capturing a photograph of the subject in an outdoor environment. The light assembly 114 provides consistent light throughout the subject regardless of the amount of ambient light at the outdoor site. In some embodiments, the light assembly 114 is configured to overpower all possible levels of ambient light and create soft shadows all the way around the subject. Soft shadows are shadows that gradually change behind the subject and allow background replacement software to easily identify the background from the subject. The effect of the light assembly 114 of the present disclosure is further described and illustrated in reference to FIG. 15.

In some embodiments, the light assembly 114 includes a ring light 250 as illustrated in FIGS. 5-7. The ring light 250 is configured to produce lighting with a soft shadow behind the subject in outdoor photography. In some embodiments, the ring light 250 is configured as a ring flash. An example of the ring light 250 is AlienBees ABR900 available from Paul C. Buff, Inc., Nashville, Tenn.

The ring light 250 includes a ring reflector 252, a light element 254, and a diffuser 246. The ring reflector 252, the light element 254, and the diffuser 256 are mounted to a body 258.

The ring reflector 252 has a diameter D1 ranging between 5 inches and 15 inches in some embodiments. In other embodiments, the diameter D1 of the ring reflector 252 ranges between 7 inches and 13 inches. In yet other embodiments, the diameter D1 of the ring reflector 252 is about 10 inches. The ring reflector 252 is designed to have a beam spread B1 (FIG. 14) ranging between 45 degrees and 115 degrees in some embodiments. In other embodiments, the beam spread B1 of the ring reflector 252 ranges between 10 degrees and 60 degrees. In yet other embodiments, the beam spread B1 of the ring reflector 252 is about 80 degrees.

The light element 254 is configured to be placed in the ring reflector 252 and shaped in a circle to be arranged around the lens of the camera 112 when the ring light 250 is mounted to the camera 112. In some embodiments, the light element 254 includes one or more flashtubes. In some embodiments, the light element 254 is made in a single circular flashtube. In other embodiments, the light element 254 includes a plurality of flashtubes. For example, two half-circle flashtubes can be arranged together to make a circular light. In some embodiments, the light element 254 has a color temperature over 5000K, the range being typically referred to as cool colors and resembling daylight. In other embodiments, the color temperature of the light element 254 is about 5600 K. An example of the light element 254 can be formed with two of identical flashtubes, which have part number ABRFT 10 MM available from Paul C. Buff, Inc., Nashville, Tenn. In addition, the light element 254 can include a plurality of modeling lamps, such as eight (8) 10-watt modeling lamps.

In other embodiments, the light element 254 includes a plurality of light bulbs or light elements that are arranged around the lens of the camera 112. In some examples, the plurality of light bulbs can be equally spaced apart from each other around a center hole 260 of the light assembly 114. In other examples, the plurality of light bulbs can be symmetrically arranged around the center hole 260 of the light assembly 114. In yet other embodiments, the plurality of light bulbs can be spaced differently.

In some embodiments, the light element 254 is arranged ahead of the face of lens of the camera 112. In other embodiments, the light element 254 is arranged to be substantially flush with the lens face of the camera 112. In yet other embodiments, the light element 254 is arranged behind the lens face of the camera 112.

The diffuser 256 is disposed over the light element 254 to spread out or scatter light from the light element 254, thereby preventing the light from coming from concentrated sources. The diffuser 256 has a diameter D2 ranging between 3 inches and 13 inches in some embodiments. In other embodiments, the diameter D2 of the diffuser 256 ranges between 5 inches and 11 inches. In yet other embodiments, the diameter D2 of the diffuser 256 is about 8 inches.

The ring light 250 has a center hole 260 through which the lens of the camera 112 is exposed. The ring reflector 252, the light element 254, and the diffuser 246 are arranged around the center hole 260 so as to provide consistent illumination around the lens 208 of the camera 112. The center hole 260 has a diameter D3 ranging between 2 inches and 6 inches. In other embodiments, the diameter D3 of the center hole 260 is around 4 inches.

As illustrated in FIG. 7, a control interface 261 of the ring light 250 can be provided at a rear side of the ring light 250. The control interface 261 includes a flash power control 262, a modeling lamp control 264, a flash test control 266, a remote controller interface 268, a reflector lock control 270, a power cord interface 272, and a sync interface 274.

The flash power control 262 is used to adjust a flash power of the light element 254. In some embodiments, the ring light 250 is configured to have a flash duration (t.5), which describes the time it takes for 50% of the total flash power to be dissipated, has $\frac{1}{2000}$ seconds at full power. The ring light 250 can have true watt second of about 320 Ws and Lumen second of about 14,000 Ls. In the illustrated example of FIG. 7, the flash power control 262 is configured to adjust a flash power from the full power to $\frac{1}{32}$ of the full power. Other power variabilities are also possible in other embodiments.

The modeling lamp control 264 is to control the modeling lights or lamps provided to the light assembly 114. A modeling light can be a continuous light source located in proximity to a flash tube to allow a photographer to visually sense the lighting effect the flash, when it fires, will create. In the illustrated example of FIG. 7, the modeling lamp control 264 allows changing the mode of modeling lamp, such as "ON," "TRACK," and "CYCLE."

The flash test control 266 is used to test a flash light when it is used as the light element 254. The remote controller interface 268 provides an interface, such as a cable port, to which a connectorized cable from a remote controller is plugged. In some embodiments, the light assembly 114 is controlled by a remote controller, and the cable is used to connect the light assembly 114 to the remote controller. In other embodiments, a control device separate from the camera 112 can be used as the remote controller.

The reflector lock control 270 is a switch to lock or unlock the ring reflector 252 to or from the body 258. The power cord interface 272 provides an outlet to connect to a power supply, such as the portable power supply 118, via a power cord 276. The sync interface 274 is an interface for connecting the light assembly 114 to the camera 112 so that the light assembly 114 is synchronized with the camera 112 in operation. In some embodiments, a cable is used to connect between the camera 112 and the light assembly 114. For example, the cable has a first end plugged into the sync interface 274 at the light assembly 114 and a second end mounted to an output interface, such as a hot shoe, of the camera 112.

Figure 8:
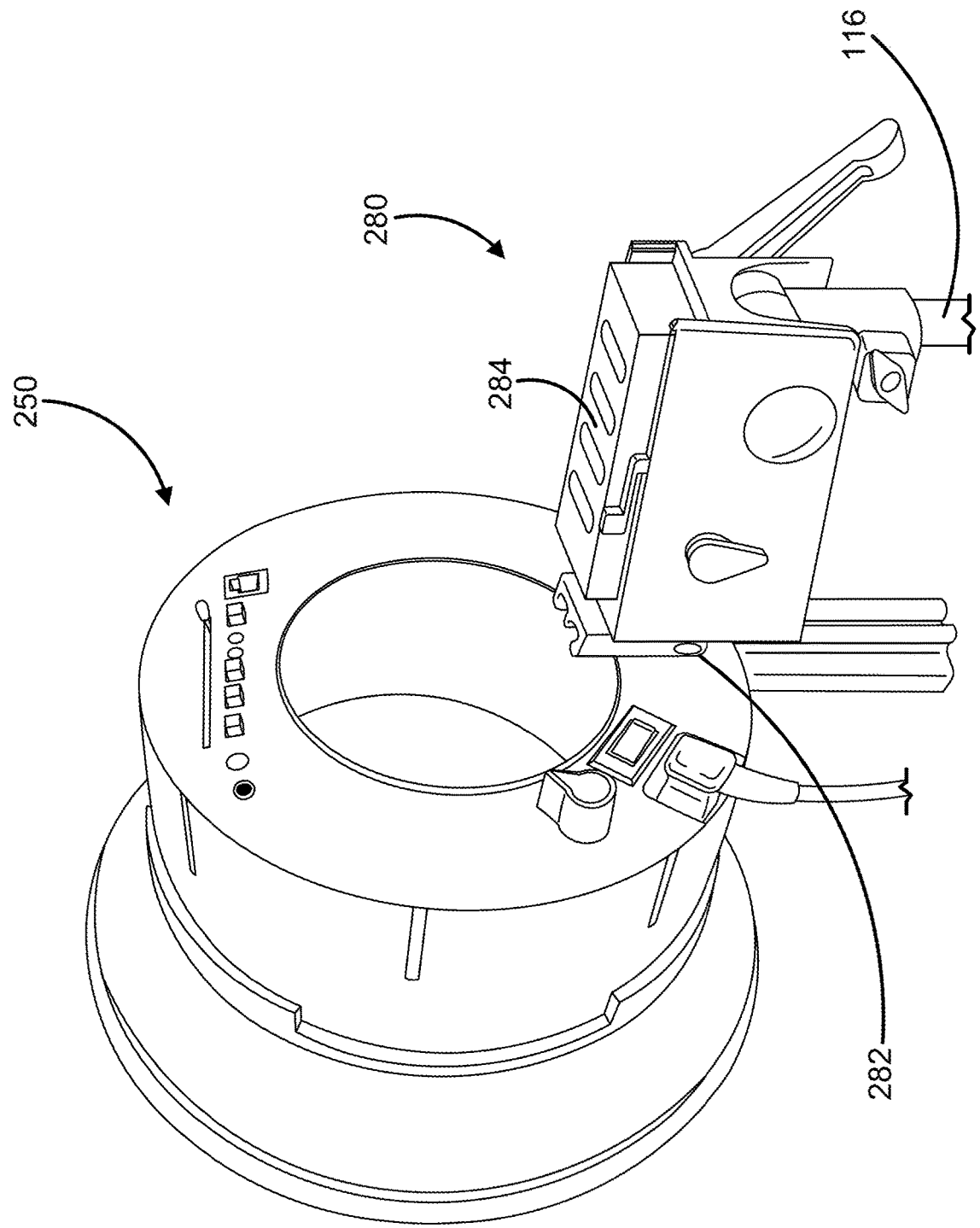
FIG. 8 illustrates an example mounting device for mounting the light assembly to a stand.

FIG. 8 illustrates an example mounting device 280 for mounting the light assembly 114 to the stand 116. In addition, the mounting device 280 is configured to support the camera 112 at a predetermined position relative to the light assembly 114. In some embodiments, the mounting device 280 is configured to be attached on the top of the stand 116. In other embodiments, the mounting device 280 can be attached to other locations of the stand 116.

The mounting device 280 includes a light mounting portion 282 for adjustably attaching the ring light 250 so that the ring light 250 vertically moves and changes its height relative to the mounting device 280. Further, the mounting device 280 provides a camera mounting portion 284 for supporting the camera 112 and adjusting the position of the camera 112 relative to the ring light 250.

Figure 9:
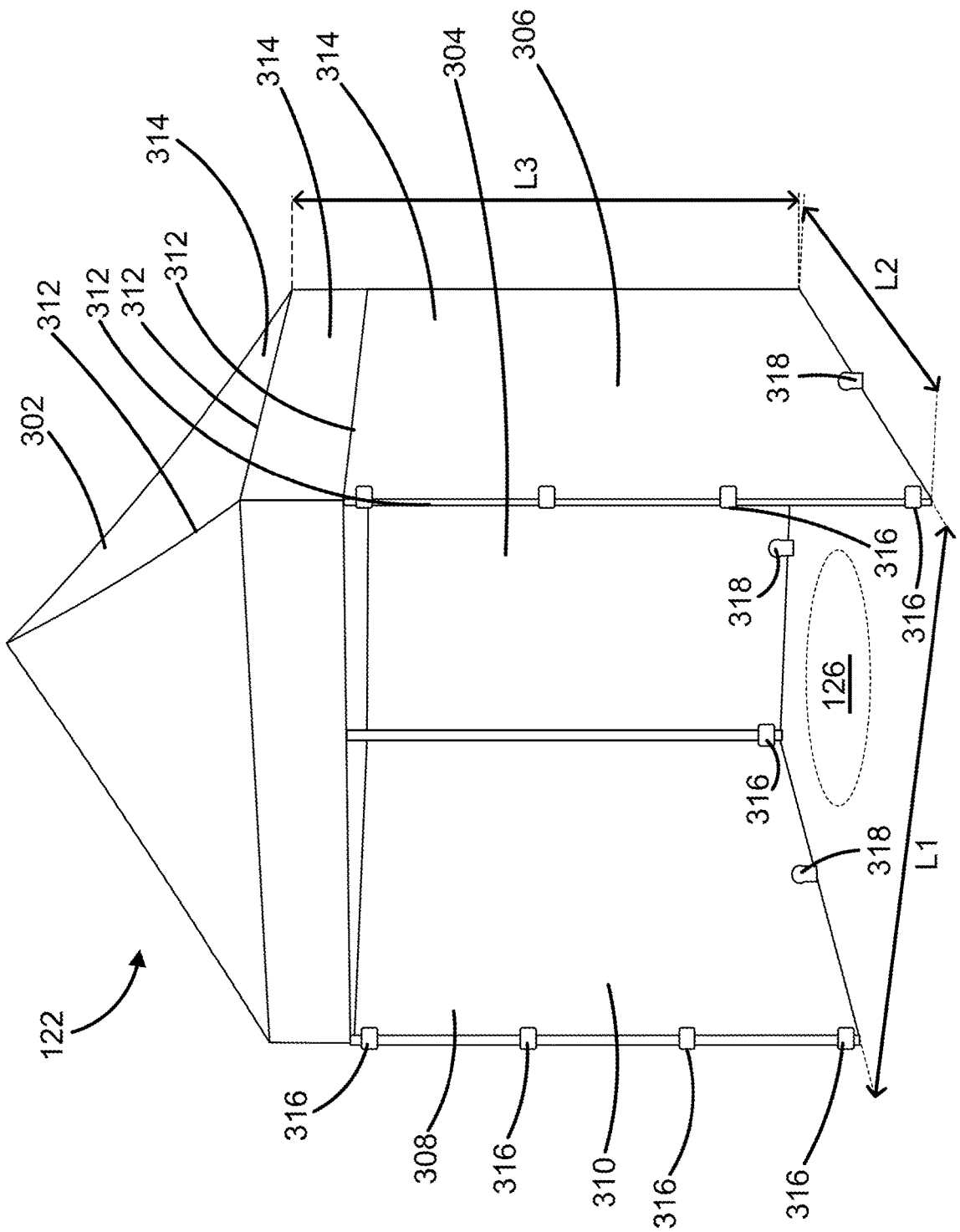
FIG. 9 illustrates an example tent of FIG. 1.

FIG. 9 illustrates an example tent 122 of FIG. 1. The tent 122 can be set up in an outdoor environment and arrange a subject at the subject space 126 within the tent 122. The tent 122 is configured to surround a subject to at least partially isolate the subject from surroundings.

In some embodiments, the tent 122 has a top cover 302, a rear cover 304, a first side cover 306, and an opposite second side cover 308. These covers 302, 304, 306, and 308 are arranged and configured to surround a subject arranged on the subject space 126 within the tent 122 such that the subject is not affected by ambient conditions, such as natural light, wind, and background scenes.

The tent 122 further includes an open side 310 through which the camera 112 captures a photograph of the subject at the tent 122. The open side 310 is arranged opposite to the rear cover 304. The open side 310 is sized such that the tent 122 or a portion thereof is not significantly captured in a photograph taken by the camera 112 when the camera 112 captures the photograph of a subject.

The tent 122 can be for various shapes. The tent 122 includes a frame 312 which can be set up at the site, and the frame 312 can be covered by one or more panels 314 to form the top cover 302, the rear cover 304, and the first and second side covers 306 and 308. The panels can be made from various materials, such as fabric, plastic, paper, and other suitable materials. The panels can be configured to at least partially prevent natural light from passing therethrough so that the natural light does not interfere with capturing a photograph of the subject in the tent. In some examples, the panels 314 can be made from polyester materials having various thicknesses, such as 300 denier or 600 denier.

In some embodiments, the panels 314 are attached to the frame 312 in various methods. In some examples, hook-and-loop fasteners (also known as Velcro) are used to fix the panels 314 to the frame 312. The tent 122 can further provide stake loops 318 to fasten the tent 122 to the ground with stakes. Other methods can be used to fix the tent 122 to the ground in other embodiments.

The tent 122 can have various dimensions. The dimension of the tent 122 can vary depending on how many subjects are to be arranged together within the tent 122. In some examples, the tent 122 has a first length L1 ranging between about 3 feet and about 30 feet, a second length L2 ranging between about 3 feet and about 20 feet, and a third length L3 (e.g., a height of the open side 310) ranging between about 5 feet and about 8 feet. By way of example, the first length L1, the second length L2, and the third length L3 of the tent 122 can be about 5 feet, about 5 feet, and about 7 feet, respectively.

Figure 10:
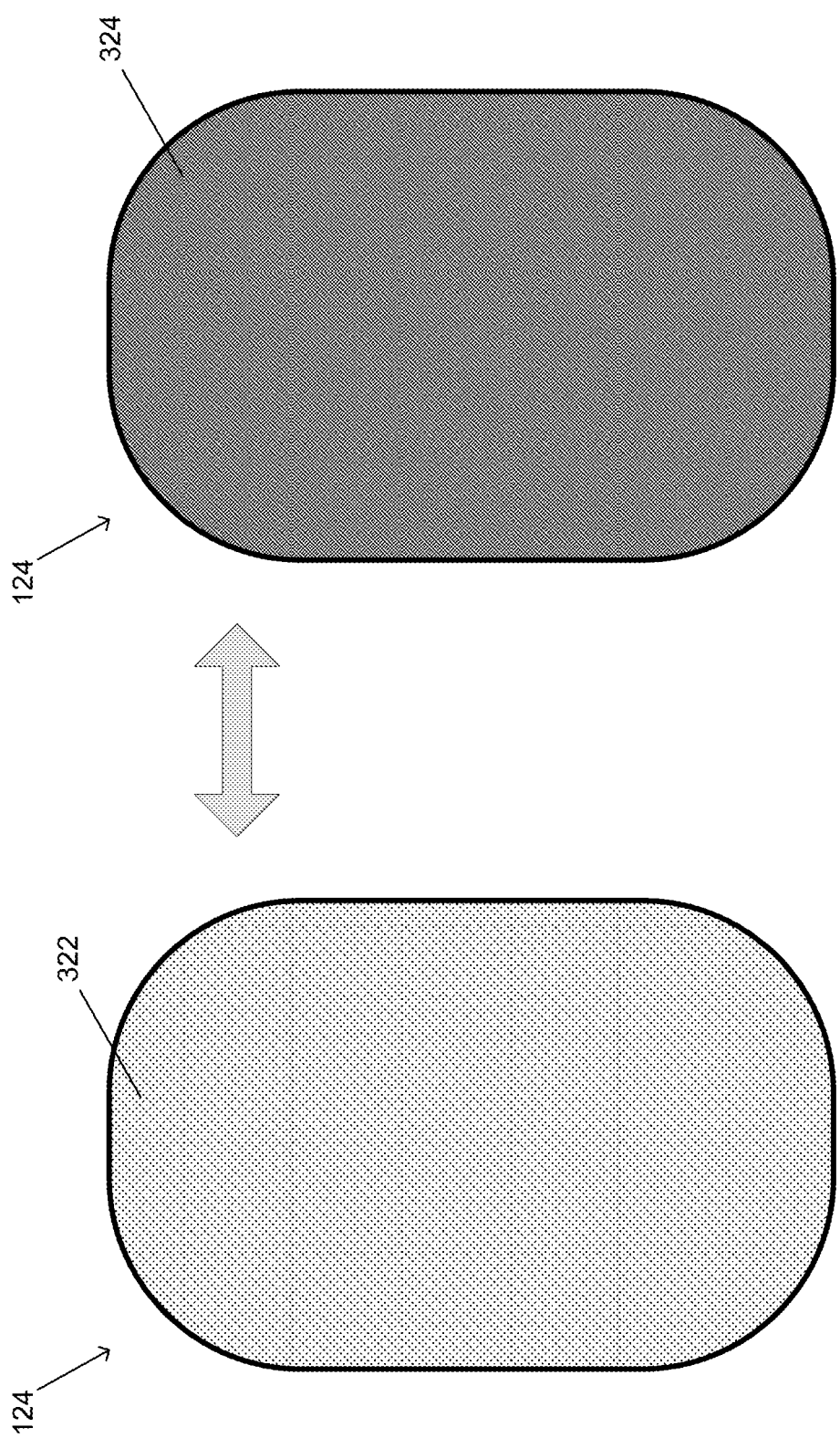
FIG. 10 illustrates an example background unit of FIG. 1.
Figure 13:
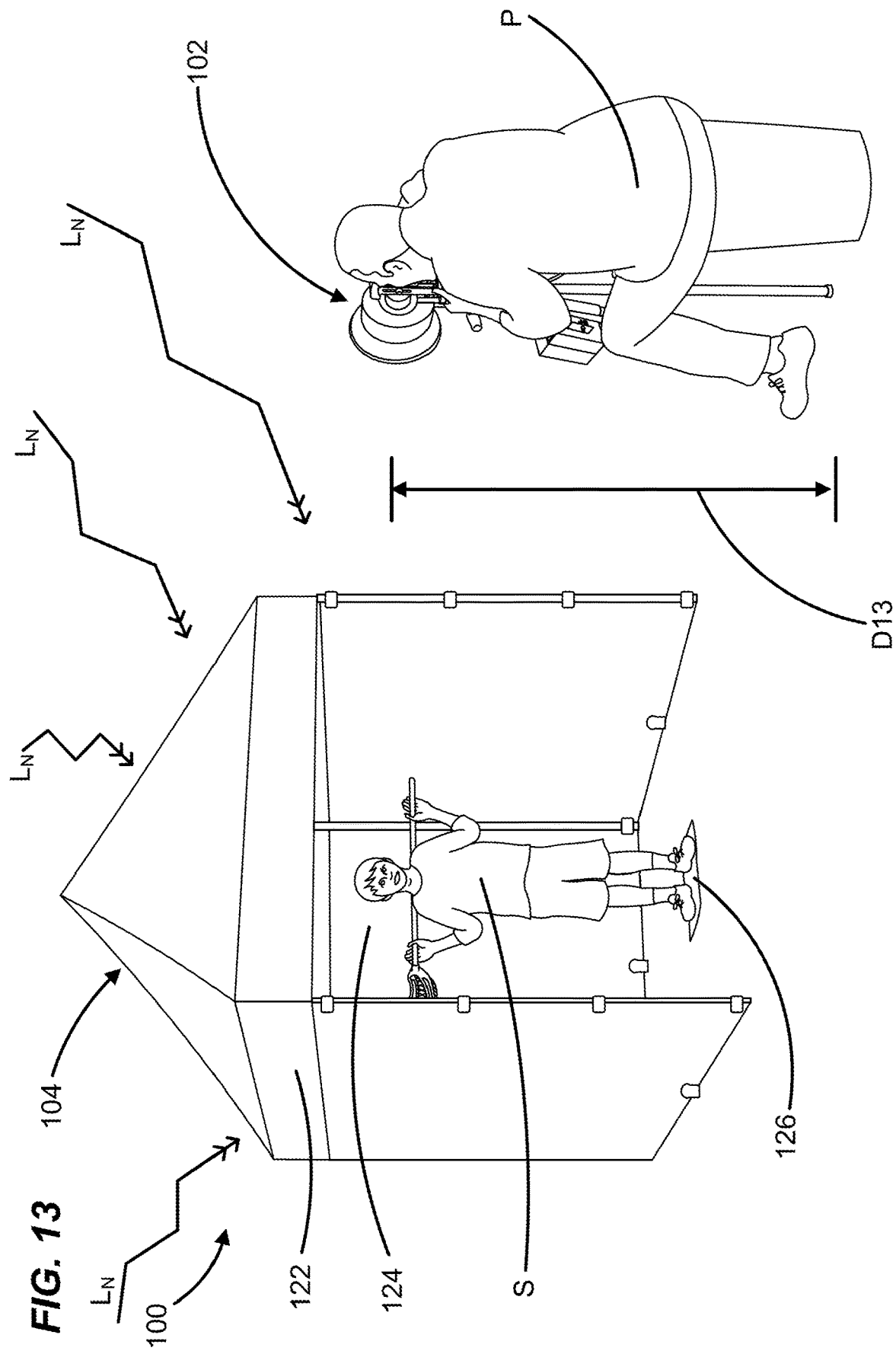
FIG. 13 illustrates an example set-up of the photography station of FIG. 1 in an outdoor environment.

FIG. 10 illustrates an example background unit 124 of FIG. 1. As illustrated in FIGS. 1 and 13, the background unit 124 is configured to be arranged at the rear cover 304 so that the background unit 124 is arranged behind the subject within the tent 122. In some embodiments, the background unit 124 is hung from a portion of the frame 312 or a portion of the panels 314 of the tent 122. In other embodiments, the background unit 124 is attached to a portion of the frame 312 or a portion of the panels 314 with fasteners of various types.

Figure 11:
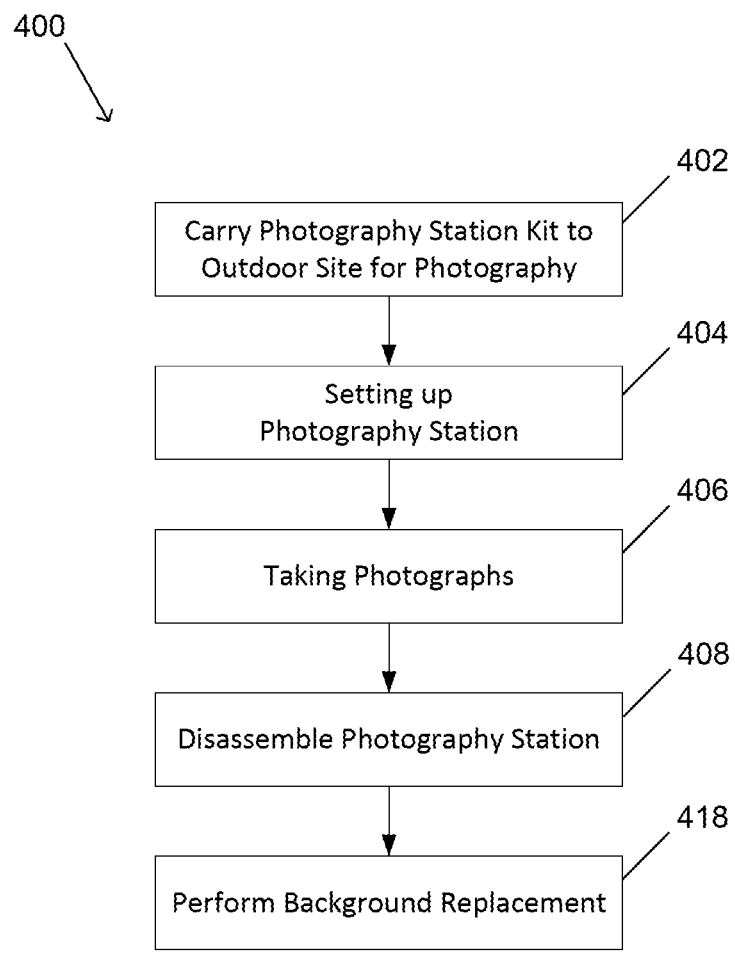
FIG. 11 illustrates an example method for performing outdoor photography using the system of FIG. 1.

As illustrated in FIG. 11, the background unit 124 has a first side 322 and a second side 324 and has different colors on the first side 322 and the second side 324. The background unit 124 can be selectively arranged to place either the first side 322 or the second side 324 behind the subject. In some examples, the first side 322 and the second side 324 are configured to have two different colors which are primarily used for background replacement technology. For example, the first side 322 and the second side 324 have different monochromatic colors, such as saturated green and blue, respectively, for chroma key compositing (also referred to as chroma green and chroma blue).

The choice of color for the background unit 123 can depend at least partly on the effects needed for specific photographs and the subjects to be photographed. Where blue and green screens are used, the choice between the two colors is driven by the clothing the subject wears. In some embodiments, the green background is primarily used unless the subject's clothing is green, in which case the background unit 123 can be flipped around to show the blue side. Although green and blue are popular, other embodiments can utilize other colors and/or patterns.

FIG. 11 illustrates an example method 400 for performing outdoor photography using the station 100 shown in FIG. 1. The method 400 can begin at operation 402, in which a photography station kit is carried or transferred to an outdoor photography site. For example, a photographer or a group of photographers can carry the photography station kit to an outdoor site at which the photography station is set up and photographs are captured using the station. The photography station kit includes the devices, elements, parts, assemblies, subassemblies, and/or components that are necessary to set up and operate the system 100. An example of the photography station kit is illustrated in FIG. 12.

At operation 404, the photography station 100 is set up on a desirable location at the site. For example, the tent 122 is set up at a desirable location at the site, and the background unit 124 is arranged within the tent 122 to provide a background when a subject is photographed by the camera 112. The image capture system 102 is also set up at the site. In some embodiments, the image capture system 102 is arranged in a predetermined location with respect to the tent 122. An example arrangement of the image capture system 102 and the station assembly 104 (including the tent 122) is illustrated with reference to FIGS. 13 and 14.

At operation 406, once all the photographs have been taken, the photography station 100 is disassembled and removed from the site. At operation 410, the photographs taken by the camera 112 are processed for background replacement. In some embodiments, the photographs are transferred to a computing device which then operates to perform background replacement processing. In other embodiments, the photographs are processed at least partially in the camera 112 for background replacement processing. An example background replacement process is described with reference to FIG. 16.

Figure 12:
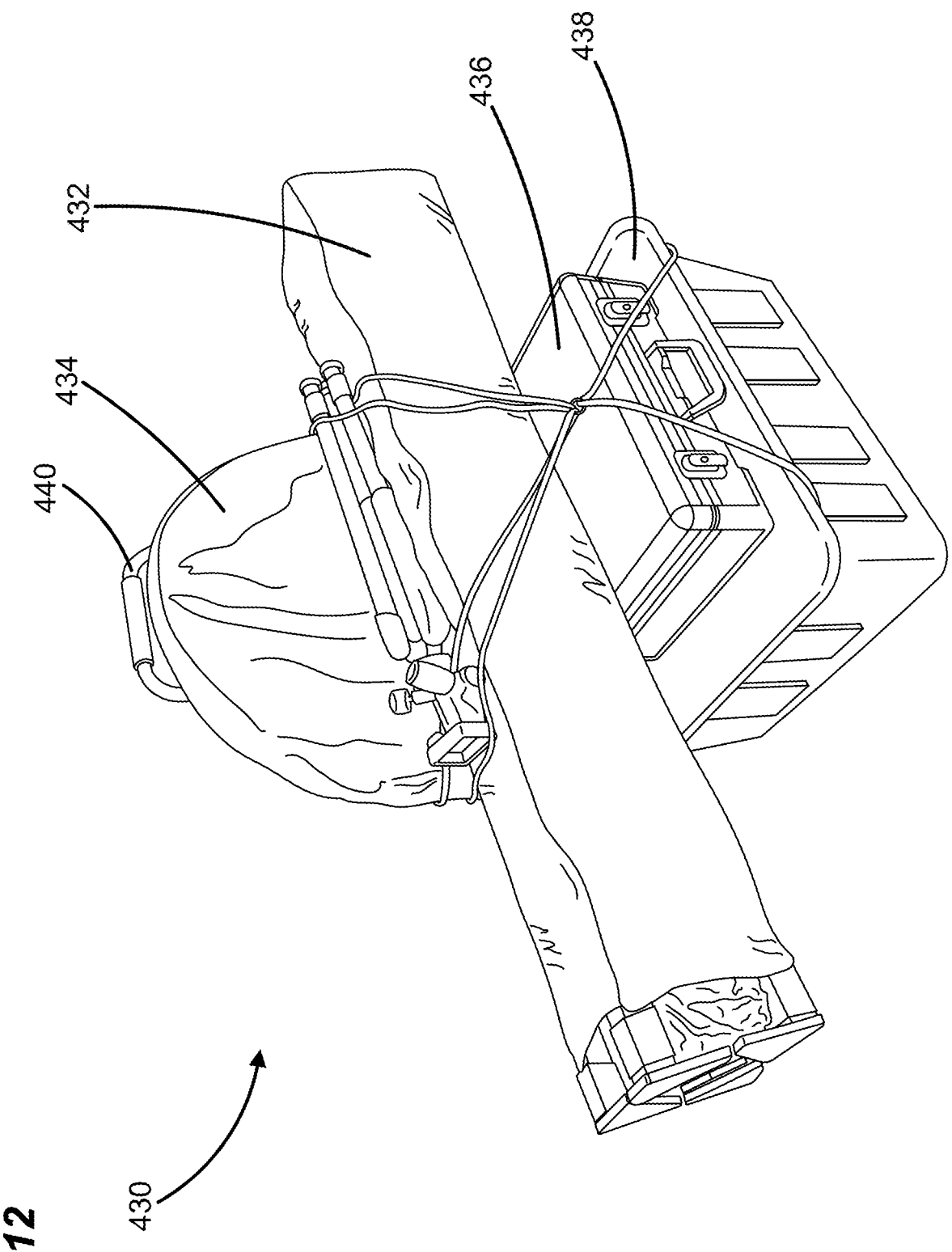
FIG. 12 illustrates an example photography station kit.

FIG. 12 illustrates an example photography station kit 430. The kit 430 includes a tent carrier 432 containing all parts of the tent 122, a background unit bag 434 for carrying the background unit 124, a camera box 436 containing all parts of the camera 112 and the stand 116, and an accessory box 438 containing various parts and accessories including the light assembly 114, the portable power supply 118, and other things necessary or helpful for outdoor photography. As illustrated, the kit 430 including the tent carrier 432, the background unit bag 434, the camera box 436, and the accessory box 438 can be simply packed up and carried with a small rolling cart 440.

Figure 14:
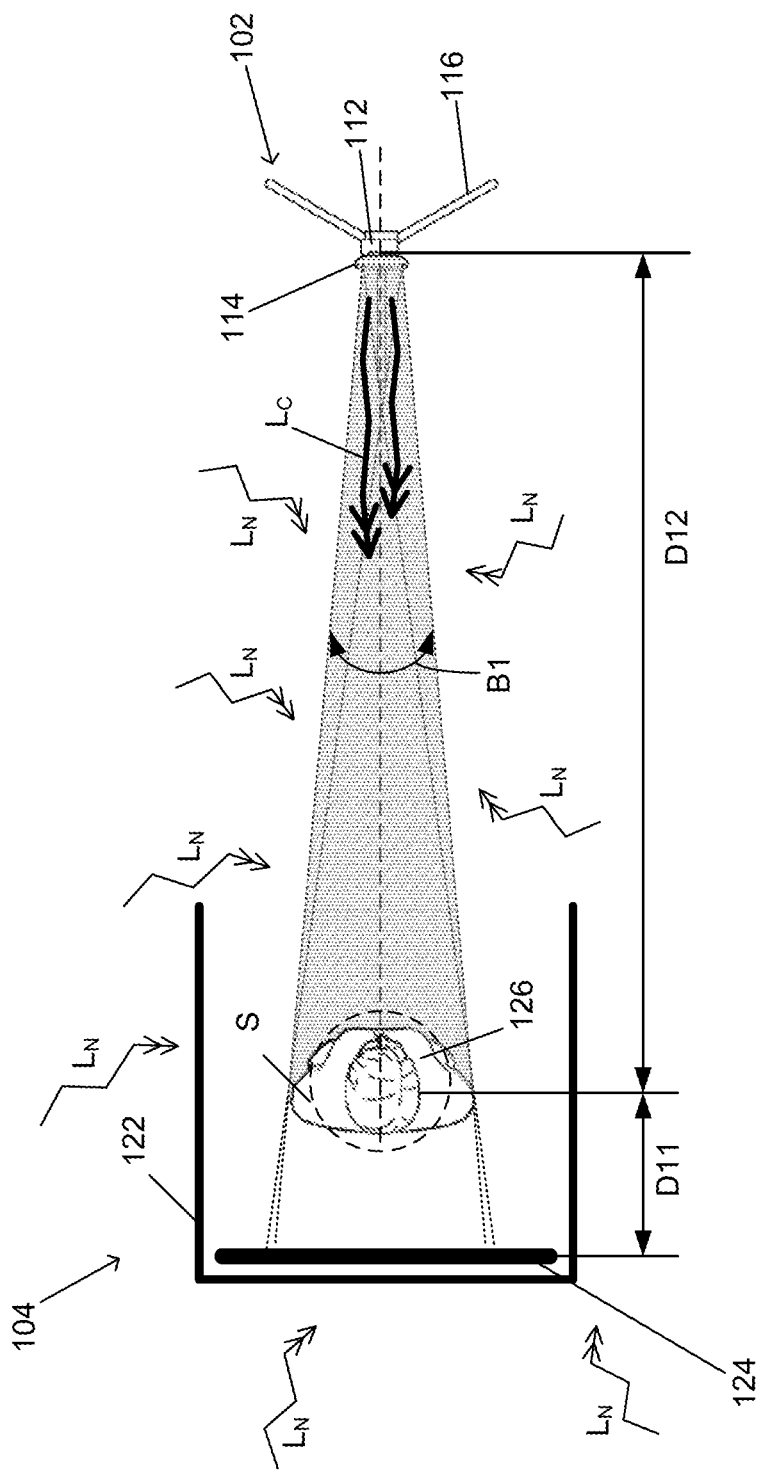
FIG. 14 is a schematic top view of an example arrangement of the photography station of FIG. 13.

Referring to FIGS. 13-14, an example arrangement and set-up of the photography station 100 is described. FIG. 13 illustrates that the photography station 100 is set up in an outdoor environment, and FIG. 14 is a schematic top view of the arrangement of the photography station 100 of FIG. 13.

As depicted in FIG. 13, a subject S is arranged at the subject space 126 in front of the background unit 124 within the tent 122. The subject S is posed toward the camera 112 through the open side 310 of the tent 122. The tent 122 is arranged to reduce the effect of ambient conditions, such as natural light and wind. The tent 122 is further used to prevent the surrounding scenes from being captured in photographs of the subject S and thus make background replacement processing simple and fast.

In some embodiments, the subject S can be a person or a group of people. Such a person or a group of people can be one or those who are involved in outdoor activities. As described herein, the photograph station 100 according to the present disclosure can be easily carried to an outdoor site where the subject S perform outdoor activities, and set up at an outdoor location close to the site, so that the subject S briefly attends for photography while doing the outdoor activities. Therefore, the subject S does not need to visit an indoor photography station to take a photograph (such as an athlete biography or profile image) relating to the outdoor activity in which the subject S is involved.

In other embodiments, the subject S can be any non-human object or a group of non-human objects. Examples of the subject S include an animal, plant, product, and anything suitable for photography.

As described herein, the subject S can also be located at an indoor setting where the photography station of the present disclosure is used at an indoor location.

Referring to FIG. 14, the image capture system 102 and the station assembly 104 are set up in a predetermined arrangement. In some examples, the subject S is spaced apart at a first distance D11 from the background unit 124 in the tent 122, and the subject S is spaced apart at a second distance D12 from the image capture system 102. In some embodiments, the first distance D11 is measured from the center of the subject space 126 to the center of the background unit 124 on the ground, and the second distance D12 is measured from the center of the subject space 126 to the center of the camera 112 or the light assembly 114. In some embodiments, the first distance D11 ranges from about 5 inches to about 50 inches, and the second distance D12 ranges from about 50 inches to about 300 inches. In other embodiments, the first distance D11 ranges from about 15 inches to about 30 inches, and the second distance D12 ranges from about 90 inches to about 150 inches. Other combinations of the first distance D11 and the second distance D12 are also possible in other embodiments.

Referring to FIG. 13, the image capture system 102 stands at a third distance or height D13 from the ground. The third distance D13 can be measured from the ground to the center of the light assembly 114 (e.g., the center hole of the ring light) or the center of the lens of the camera 112. In some embodiments, the third distance D13 ranges from about 20 inches to about 70 inches. In other embodiments, the third distance D13 ranges from about 40 inches to about 60 inches. Other examples of the third distance D13 are also possible in other embodiments.

In some embodiments, the camera 112 is configured to have predetermined settings for outdoor photography. Depending on the arrangement of the image capture system 102, the station assembly 104, and the subject S, various features of the camera 112 can be used and/or adjusted. Example factors which can be adjusted include lens focal length, ISO, shutter speed, aperture size, exposure, light power, light type, and any other attributes replaceable or adjustable associated with the image capture system 102. Example settings are shown in Table 1 below:

TABLE 1

|  | Setting 1 | Setting 2 | Setting 3 |
|---|---|---|---|
| Camera Type | DSLR | DSLR | DSLR |
| Lens Focal Length | 55 mm | 50 mm | 60 mm |
| ISO | 100 | 100 | 100 |
| Shutter Speed | 1/250 | 1/250 | 1/250 |
| Aperture | f/11 | f/11 | f/11 |
| Exposure | 0 (neutral) | 0 (neutral) | 0 (neutral) |
| Light Type | Ring Flash | Ring Flash | Ring Flash |
| Light Power | Half of 320 Ws | ¼ of 320WS | ¾ of 320WS |
| First Distance (D11) | 2 ft | 2 ft | 2 ft |
| Second Distance (D12) | 10 ft | 8 ft | 12 ft |

As shown in FIG. 14, the light assembly 114 is configured to illuminate a light $L_R$ having a power stronger than a natural light $L_N$ in the surroundings. The ring light 250 of the light assembly 114 is configured to predominate over a power of ambient natural light in all circumstances.

For comparison purposes, if a ring flash were to be used for a studio portrait (e.g., a beauty face shot), the settings of the camera would be configured significantly different than those for the outdoor photography as described herein. For example, a DSLR camera with a longer focal length (e.g., 85 mm) lens could be used to avoid facial distortions (e.g., making the nose look too big). Depending on the lighting conditions camera settings of ISO 200, 1/125 shutter speed, and f/4 aperture could be used. Further, because the camera and ring flash are arranged close to the subject, the power can be adjusted to a low power setting, such as in a range from about 10 Ws and about 40 Ws.

In contrast, when the ring flash is used in the context of the outdoor photography system, such as discussed, herein, the ring flash is arranged at a greater distance from the subject than in studio portrait photography, and uses a wider lens than the lens used in the studio photography. The lens focal length and distance are selected so that the edges of the background screen are not visible in the images. In some embodiments, the focal length is less than the focal length used in studio photography and, for example, can range from about 15 mm to about 60 mm. In some embodiments the ISO setting can be lower for outdoor photography than for studio photography. The shutter speed can be faster for the outdoor setting than for the studio setting. In some embodiments the lens aperture setting has a smaller size (higher f-number) for the outdoor setting than for the studio setting. In some embodiments, the power of the ring flash can be higher for the outdoor setting than for the indoor setting and, for example, can range between about 40 Ws and about 160 Ws, or from about 60 Ws to about 160 Ws, or greater than about 60 Ws. In some embodiments, the camera, ring flash, and distance settings for the outdoor photography can remain unchanged throughout the entire photography session, regardless of any change in ambient conditions. One reason for this is that the brightness of the light from the ring flash is so much greater than the ambient light that differences in ambient light do not have a significant impact on the digital images captured by the digital camera.

Figure 15:
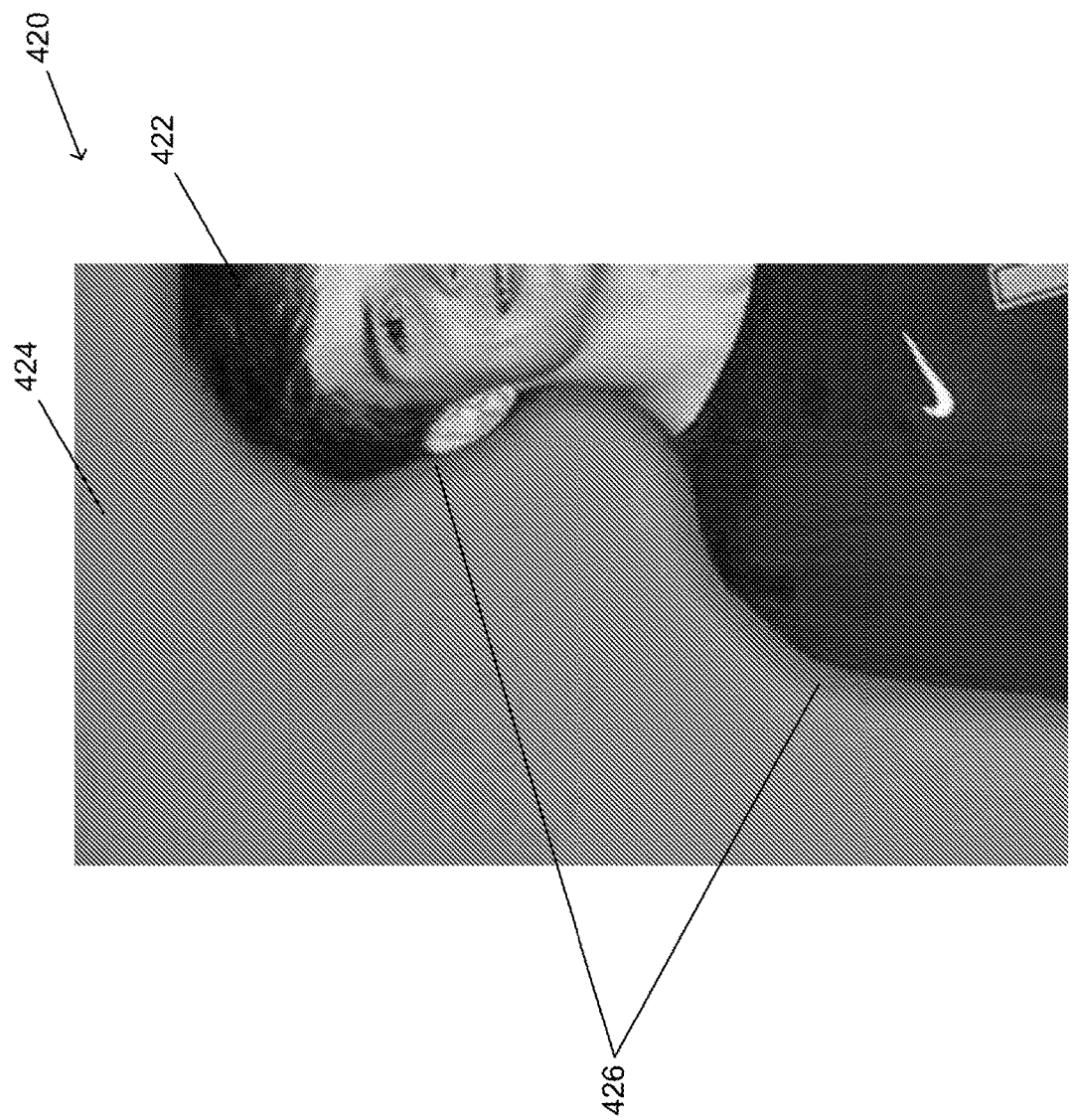
FIG. 15 illustrates a portion of an example photograph showing a shadow created by the light assembly.

FIG. 15 illustrates a portion of an example photograph 420 showing a shadow created by the light assembly 114. In this example, the photograph 420 shows a subject image 422, a background image 424, and a shadow 426 formed behind the subject S. As described herein, the shadow 426 that is created by the ring light 250 of the light assembly 114 is a soft shadow all the way around the subject S. As illustrated, the density of the shadow 426 gradually decreases away from the outline of the subject image 422 until the shadow 426 disappears in the background image 424. Further, the shadow 426 is consistently formed all around the outline of the subject image 422. For example, the region of the shadow 426 has the same or substantially similar width, pattern, and density change throughout the entire outline of the subject image 422. As such, background replacement software can easily recognize the shadow 426 in the photograph 420, and thus the subject image 422 can be simply identified and separated from the background image 424.

As described herein, the system of the present disclosure enables a consistent quality image extraction using only one light source of a particular type in outdoor conditions. In contrast, typical photography stations, either indoor or outdoor settings, require more than one light to achieve similar results.

Figure 16:
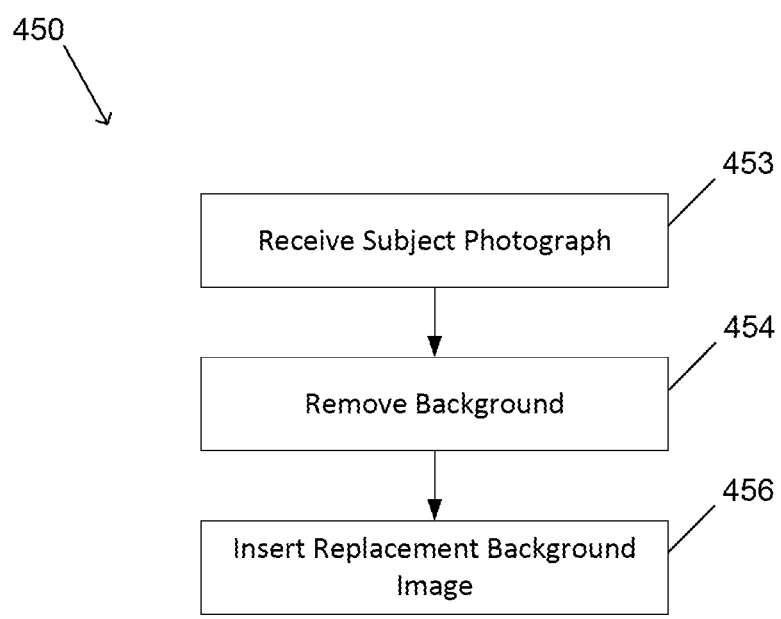
FIG. 16 illustrates an example background replacement method.
Figure 17:
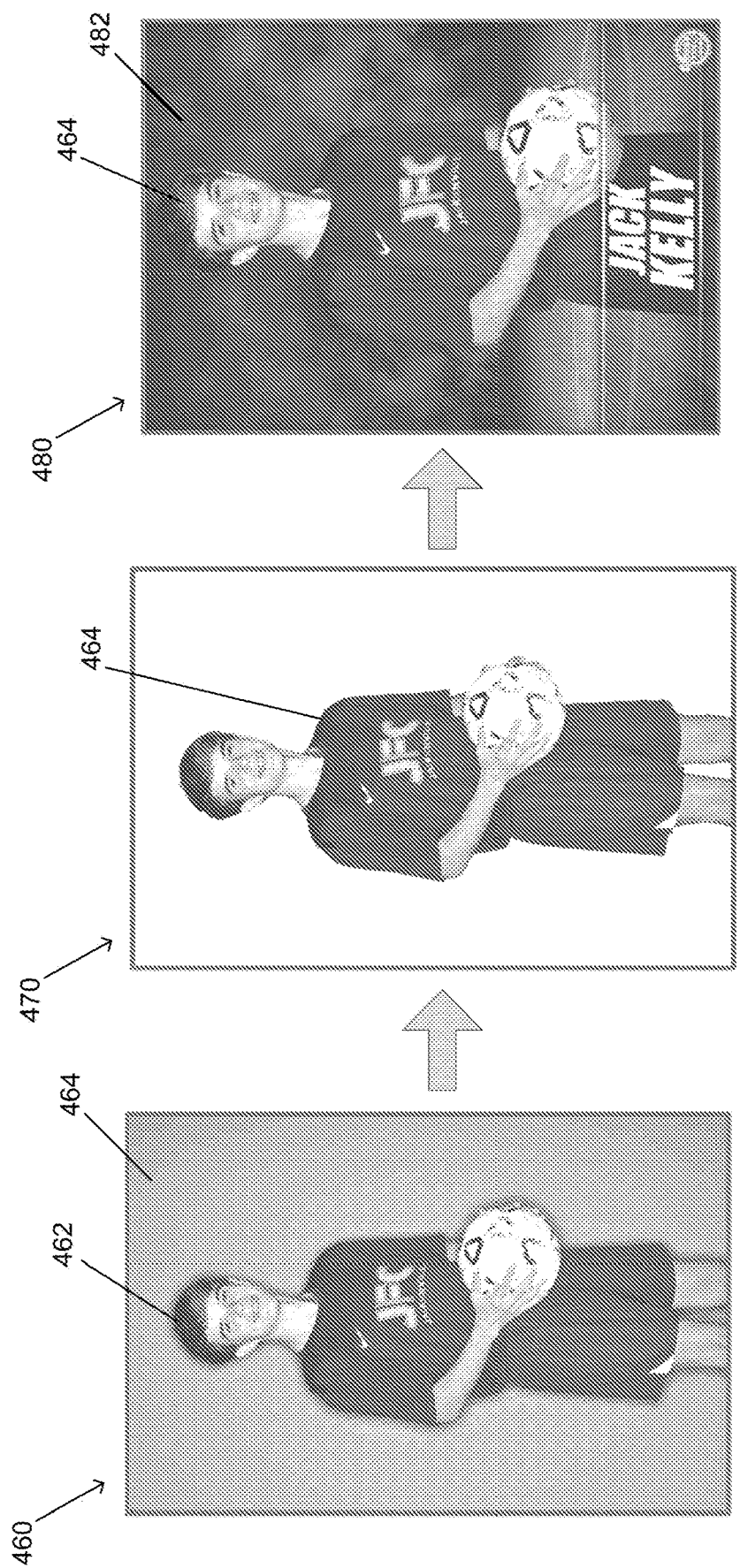
FIG. 17 shows example images in the background replacement processing.

Referring to FIGS. 16-17, an example background replacement method 450 is described. One example of a background replacement technology involves chroma key technology (also sometimes referred to as blue screen or green screen technology). The chroma key technology is a post-production technique for compositing or layering two images or video streams together based on color hues.

Figure 18:
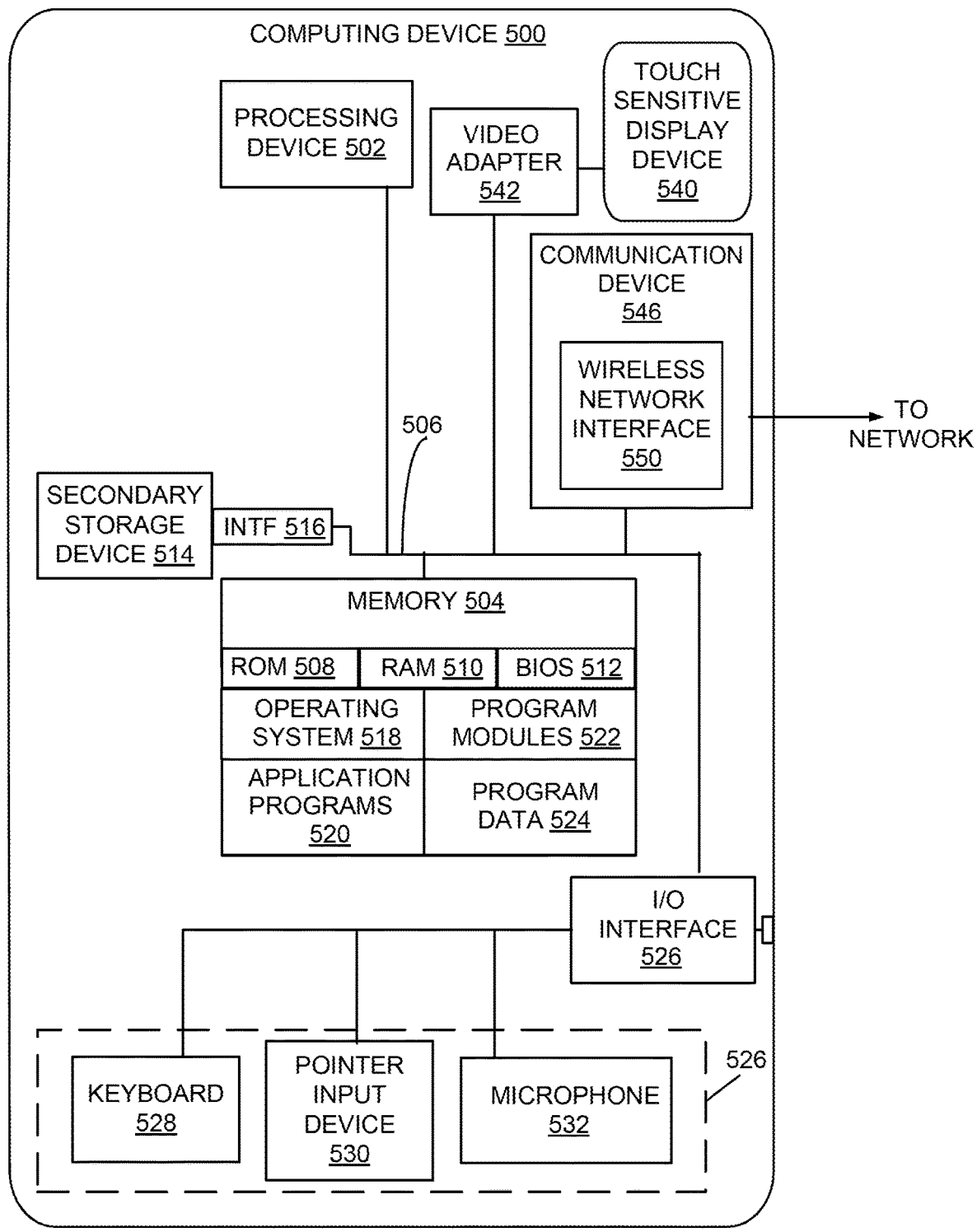
FIG. 18 illustrates an exemplary architecture of a computing device which can be used in the present disclosure.

In some embodiments, the method 450 can be performed by a background replacement engine or software running on one or more computing devices, as described in FIG. 18.

As described in FIG. 16, at operation 452, the method 450 receives a photograph 460 taken of a subject S in the photography station 100. As illustrated in FIG. 17, the photograph 460 captures the subject S as a subject image 462 and the background unit 124 as a background image 464. An example format of the original photograph 460 is JPEG.

At operation 454, the background image 464 is removed. In some embodiments, a background scene mask is generated, which is configured to remove the background image 464 from the photograph 460 and leave the subject image 462. In FIG. 17, a masked image 470 shows that the background image 464 is removed from the original photograph 460. An example format of the extracted photograph 470 is PNG.

At operation 456, a replacement background image 482 replaces the background image 464 of the original photograph 460. In some embodiments, the masked image 470 having the subject image 462 is composited with a replacement background image 482. A composite photograph 480 shows the subject image 462 with the replacement background image 482.

FIG. 18 illustrates an exemplary architecture of a computing device 500 which can be used in the present disclosure. The computing device 500 illustrated in FIG. 18 is used to execute the operating system, application programs, and software modules (including the software engines) described herein.

The computing device 500 can be of various types. In some embodiments, the computing device 500 is a desktop computer, a laptop computer, or other devices configured to process digital instructions. In other embodiments, the computing device 500 is a mobile computing device. Examples of the computing device 500 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices.

In some examples, at least a portion of the computing device 500 can be used to implement computing devices used in the photography station 100. It is also recognized that at least some of the architecture illustrated in FIG. 18 can also be implemented in various computing devices used to achieve aspects of the present disclosure. For example, a computing device for processing background replacement can be configured similarly to the architecture of FIG. 18.

The computing device 500 includes, in some embodiments, at least one processing device 502, such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures including a memory bus, or memory controller; a peripheral bus; and a local bus using any of a variety of bus architectures.

The system memory 504 includes read only memory 508 and random access memory 510. A basic input/output system 512 containing the basic routines that act to transfer information within the computing device 500, such as during start up, is typically stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage devices and their associated computer readable media provide nonvolatile storage of computer readable instructions (including application programs and program modules), data structures, and other data for the computing device 500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, compact disc read only memories, digital versatile disk read only memories, random access memories, or read only memories. Some embodiments include non-transitory media.

A number of program modules can be stored in secondary storage device 514 or memory 504, including an operating system 518, one or more application programs 520, other program modules 522, and program data 524.

In some embodiments, the computing device 500 includes input devices to enable a user to provide inputs to the computing device 500. Examples of input devices 526 include a keyboard 528, a pointer input device 530, a microphone 532, and a touch sensitive display device 540.

Other embodiments include other input devices. The input devices are often connected to the processing device 502 through an input/output interface 538 that is coupled to the system bus 506. These input devices 526 can be connected by any number of input/output interfaces, such as a parallel port, serial port, game port, or a universal serial bus. Wireless communication between input devices and interface 538 is possible as well, and includes infrared, BLUETOOTH® wireless technology, 802.11a/b/g/n, cellular, or other radio frequency communication systems in some possible embodiments.

In this example embodiment, a touch sensitive display device 540 is also connected to the system bus 506 via an interface, such as a video adapter 542. The touch sensitive display device 540 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 540, the computing device 500 can include various other peripheral devices (not shown), such as speakers or a printer.

The computing device 500 further includes a communication device 546 configured to establish communication across the network. In some embodiments, when used in a local area networking environment or a wide area networking environment (such as the Internet), the computing device 500 is typically connected to the network through a network interface, such as a wireless network interface 550. Other possible embodiments use other wired and/or wireless communication devices. For example, some embodiments of the computing device 500 include an Ethernet network interface, or a modem for communicating across the network. In yet other embodiments, the communication device 546 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 500 typically includes at least some form of computer-readable media. Computer readable media includes any available media that can be accessed by the computing device 500. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 18 is also an example of programmable electronics, which may include one or more such computing devices, and when multiple computing devices are included, such computing devices can be coupled together with a suitable data communication network so as to collectively perform the various functions, methods, or operations disclosed herein.

As such, the photography system of the present disclosure improves images of a subject captured in an outdoor environment to be suitable for background replacement. Background replacement technology involves a process of accurately distinguishing a background image from a foreground subject image in a photograph. Background replacement can be difficult for outdoor photographs because inconsistent and unexpectedly changing outdoor conditions can cause photographs undesirable for background replacement. In some examples, a photograph quality can be poor and inconsistent due to inconsistent natural light. For example, natural light can cause blown-out or blurring of at least a portion of the subject image and generate undesirable shadows. In other examples, outdoor photographs can capture undesirable background scenes, such as moving objects or unpleasant scenes. In other examples, strong or changing winds can sometimes make it harder to set up and use multiple parts, such as lights, when taking photographs at an outdoor site.

In addition, the present disclosure provides a photography station that is portable to any outdoor site and easy to operate without significant training in field. The photography station of the present disclosure also provides an efficient, low-cost solution to illuminate a subject while not being significantly affected by inconsistent natural light. In some embodiments, the photography station employs a ring light, such as a ring flash. A typical ring flash is used in indoor or studio setting to create a subtle fill light or a glamorous look for, for example, close-up portrait photography. However, for the purpose of outdoor photography as described herein, the ring light of the present disclosure is configured to eliminate shadows, which would make background replacement processing difficult, by providing consistent light all around the subject and overpowering any ambient natural light that can cast undesired shadows on the subject.

Moreover, the system of the present disclosure simplifies photographer's set-up of the photography station and allows photographers to focus more on substantial work, such as the subject's expression, pose and any related paperwork.

Although it is primarily described that a single ring light is sufficient and desirable to illuminate a subject for outdoor photography, it is understood that the ring light can be used with one or more other lights for providing different effects. In other embodiments, the ring light in the outdoor photography station of the present disclosure can be configured to provide a continuous light over time, instead of a flash light.

Further, in other embodiments, the system or the present disclosure can be used at an indoor location and provide an easy setup of the station and post production.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A photography system comprising:
    an image capture system comprising:
        a stand including a mounting device;
        a digital camera unit mounted to the mounting device and arranged and configured to capture a digital image of a subject, the digital camera unit having a lens;
        a ring flash mounted to the mounting device and having a center hole, the ring flash being arranged with respect to the digital camera unit so that the lens extends at least partially within the center hole;
        a camera control interface configured to synchronize the capture of the digital image with illumination of the subject from the ring flash;
    a portable outdoor tent providing a subject space for arranging the subject during photography, the tent having a top cover, a rear cover, opposing side covers, and an open side arranged opposite to the rear cover, the tent configured to surround the subject to at least partially isolate the subject from surroundings, the digital camera unit and the ring flash arranged outside of the tent and facing the open side of the tent through which the digital camera unit captures the digital image of the subject; and
    a background unit arranged within the tent to provide a background when the subject is photographed by the digital camera unit.

2. The photography system of claim 1, wherein the ring flash comprises:
    a body having the center hole, the center hole configured to at least partially receive a lens of the digital camera unit when the ring flash is arranged with respect to the digital camera unit;
    a ring reflector mounted to the body;
    a light element placed in the ring reflector and arranged around the center hole of the body; and
    a diffuser disposed over the light element.

3. The photography system of claim 2, wherein the light element includes one or more flashtubes.

4. The photography system of claim 1, wherein the digital camera unit includes the camera control interface operable to control the photography system to:
    illuminate the subject with the ring flash; and
    capture the digital image with the digital camera unit.

5. The photography system of claim 1, further comprising a portable power supply for providing power to the digital camera unit and the ring flash.

6. The photography system of claim 1, wherein the background unit has a first side and an opposite second side, the first side and the second side having different monochromatic colors for chroma key compositing.

7. The photography system of claim 1, wherein the subject is spaced apart at a first distance from the background unit in the tent and spaced apart at a second distance from the image capture system, the first distance ranging between about 15 inches and about 30 inches, and the second distance ranging between about 90 inches and about 150 inches.

8. The photography system of claim 1, wherein the digital camera unit is set to have a lens focal length of about 55 mm, a shutter speed of about 1/250, and an aperture of about f/11.

9. The photography system of claim 1, wherein the ring flash operates with a power equal to or greater than 80 Watt/seconds.

10. The photography system of claim 1, wherein the ring flash is a sole light source of the photography system that generates light to overpower ambient light.

11. A method for capturing a digital image of a subject in an outdoor environment, the method comprising:
    setting up an outdoor tent in the outdoor environment, the outdoor tent having a top cover, a rear cover, opposing side covers, and an open side arranged opposite to the rear cover;
    setting up a stand outside the tent, the stand including a mounting device;
    mounting a digital camera unit to the mounting device and arranging the digital camera unit facing the open side of the outdoor tent, the digital camera unit having a lens;
    mounting a ring flash unit having a center hole to the mounting device such that the lens extends at least partially within the center hole and facing the open side of the outdoor tent;
    arranging the subject within the outdoor tent to surround the subject;
    controlling the ring flash unit to illuminate the subject through the open side of the tent; and
    controlling the digital camera unit to capture a digital image through the open side of the tent synchronized with the illumination of the subject by the ring flash unit.

12. The method of claim 11, further comprising:
    arranging a background unit in the outdoor tent to face a first side of the background unit toward the open side of the outdoor tent, the first side having a first monochromatic color for chroma key compositing.

13. The method of claim 12, further comprising:
    arranging the background unit in the outdoor tent to face a second side of the background unit toward the open side of the outdoor tent, the second side being opposite to the first side and having a second monochromatic color for chroma key compositing, the second monochromatic color being different from the first monochromatic color.

14. The method of claim 11, further comprising:
    mounting a portable power supply for providing power to the digital camera unit and the ring flash unit.

15. The method of claim 11, wherein the ring flash comprises:
    a body having a center hole, the center hole configured to at least partially receive a lens of the digital camera unit when the ring flash is arranged with respect to the digital camera unit;
    a ring reflector mounted to the body;
    a light element placed in the ring reflector and arranged around the center hole of the body; and
    a diffuser disposed over the light element.

16. The method of claim 15, wherein the light element includes one or more flashtubes.

17. The method of claim 11, wherein the subject is spaced apart at a first distance from the background unit in the tent and spaced apart at a second distance from the image capture system, the first distance ranging between about 15 inches and about 30 inches, and the second distance ranging between about 90 inches and about 150 inches.

18. A photography system comprising:
- a digital camera unit having a lens arranged and configured to capture a digital image of a subject;
- a ring flash having a center hole arranged with respect to the digital camera unit so that the lens extends at least partially within the center hole;
- a camera control interface configured to synchronize the capture of the digital image with illumination of the subject from the ring flash;
- a portable outdoor tent providing a subject space for arranging the subject during photography, the outdoor tent having a top cover, a rear cover, opposing side covers, and an open side arranged opposite to the rear cover, the outdoor tent configured to surround the subject to at least partially isolate the subject from surroundings, the digital camera unit and the ring flash arranged outside the outdoor tent and facing the open side of the tent through which the digital camera unit captures the digital image of the subject;
- a background unit arranged within the outdoor tent to provide a background when the subject is photographed by the digital camera unit; and
- a computing device comprising:
    - a processing device; and
    - at least one computer readable storage device storing data instructions, which when executed by the processing device, cause the processing device to:
        - detect a background scene in the digital image associated with the background unit; and
        - distinguish the background scene from the subject in the digital image based at least in part upon the detected background scene.

* * * * *